(12) United States Patent
Matsumura et al.

(10) Patent No.: US 11,880,022 B2
(45) Date of Patent: Jan. 23, 2024

(54) LENS SYSTEM, IMAGING DEVICE, AND IMAGING SYSTEM INCLUDING A LENS ELEMENT HAVING A FREE-CURVE SURFACE

(71) Applicant: Panasonic Intellectual Property Management Co., Ltd., Osaka (JP)

(72) Inventors: Yoshio Matsumura, Osaka (JP); Hiroyuki Shobayashi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 696 days.

(21) Appl. No.: 17/029,608

(22) Filed: Sep. 23, 2020

(65) Prior Publication Data
US 2021/0011263 A1  Jan. 14, 2021

Related U.S. Application Data

(63) Continuation of application No. PCT/JP2018/034867, filed on Sep. 20, 2018.

(30) Foreign Application Priority Data

Mar. 28, 2018  (JP) .................................. 2018-062595

(51) Int. Cl.
*G02B 13/18* (2006.01)
*G02B 5/00* (2006.01)
(Continued)

(52) U.S. Cl.
CPC ............. *G02B 13/18* (2013.01); *G02B 5/005* (2013.01); *G02B 13/0045* (2013.01);
(Continued)

(58) Field of Classification Search
None
See application file for complete search history.

(56) References Cited

U.S. PATENT DOCUMENTS

2006/0274433 A1  12/2006  Kamo
2007/0133107 A1   6/2007  Ohzawa et al.
(Continued)

FOREIGN PATENT DOCUMENTS

JP   2006-11093    1/2006
JP   2006-337691  12/2006
(Continued)

OTHER PUBLICATIONS

Office Action dated Aug. 23, 2022 in corresponding Japanese Patent Application No. 2020-508961, with English translation.
(Continued)

*Primary Examiner* — Quan Pham
(74) *Attorney, Agent, or Firm* — WENDEROTH, LIND & PONACK L.L.P.

(57) ABSTRACT

A lens system that forms an image on an imaging element, includes: first to third lens element arranged in order; a diaphragm; and a lens element on the image surface side. At least one of the first and second lens elements has a free-curved surface, and one of the first and second lens elements has free-curved surfaces on both sides. The third lens element has free-curved surfaces on both sides. The first lens element has a convex shape, toward the object side, of a surface facing the object side. The second lens element has a convex shape, toward the object side, of a surface facing the image surface side. The third lens element has a convex shape, toward the image surface side, of a surface facing the object side. The lens element on the image surface side has, at least on the object side, a free-curved surface.

13 Claims, 53 Drawing Sheets

(51) Int. Cl.
  *H04N 23/80* (2023.01)
  *G02B 13/08* (2006.01)
  *G02B 13/00* (2006.01)
  *B60R 1/00* (2022.01)
  *G02B 9/12* (2006.01)

(52) U.S. Cl.
  CPC ............ *G02B 13/08* (2013.01); *H04N 23/80* (2023.01); *B60R 1/00* (2013.01); *B60R 2300/10* (2013.01); *B60R 2300/20* (2013.01); *G02B 9/12* (2013.01)

(56) References Cited

U.S. PATENT DOCUMENTS

| | | | |
|---|---|---|---|
| 2009/0268305 A1* | 10/2009 | Pretorius | G02B 13/08 700/103 |
| 2010/0079874 A1 | 4/2010 | Kamei | |
| 2016/0011401 A1* | 1/2016 | Chen | G02B 13/0045 359/713 |
| 2017/0212334 A1 | 7/2017 | Imaoka | |
| 2018/0067284 A1* | 3/2018 | Lee | G02B 13/0045 |
| 2019/0293907 A1* | 9/2019 | Emi | G02B 7/008 |

FOREIGN PATENT DOCUMENTS

| | | |
|---|---|---|
| JP | 2007-328030 | 12/2007 |
| JP | 2016-126254 | 7/2016 |
| JP | 2017-134394 | 8/2017 |
| WO | 03/010599 | 2/2003 |

OTHER PUBLICATIONS

Office Action dated Dec. 3, 2021 in corresponding Chinese Patent Application No. 201880091694.0, with English-language translation.
Notice of Reasons for Refusal dated Dec. 6, 2022 in corresponding Japanese Patent Application No. 2020-508961, with English language translation.
Office Action dated May 19, 2022 in corresponding Chinese Patent Application No. 201880091694.0, with English-language translation.
Office Action dated Sep. 9, 2022 in corresponding Chinese Patent Application No. 201880091694.0, with English-language translation.
Translation of the International Preliminary Report on Patentability dated Oct. 1, 2020 in International (PCT) Application No. PCT/JP2018/034867.
Extended European Search Report dated Apr. 16, 2021 in corresponding European Patent Application No. 18911796.3.
International Search Report dated Nov. 20, 2018 in International (PCT) Application No. PCT/JP2018/034867.
Office Action dated Sep. 13, 2023 in European Application No. 18 911 796.3.
Smith, Warren J., "Modern Lens Design" In: "Modem Lens Design", Jan. 1992, XP055152035, pp. 25-27.

* cited by examiner

Fig. 4

| | 1ST NUMERICAL EXAMPLE | | | | |
|---|---|---|---|---|---|
| s | SURFACE TYPE | r | d | nd | vd |
| 1 | Spherical surface | 12.357 | 0.808 | 1.85150 | 40.8 |
| 2 | Spherical surface | 3.349 | 1.687 | | |
| 3 | XY-polynomial surface | -3.134 | 0.808 | 1.53650 | 56.4 |
| 4 | XY-polynomial surface | 2.060 | 1.555 | | |
| 5 | XY-polynomial surface | -2.104 | 2.020 | 1.53650 | 56.4 |
| 6 | XY-polynomial surface | 10.975 | 0.262 | | |
| 7 | Aspherical surface | 4.073532 | 1.143 | 1.80410 | 40.9 |
| 8 | Aspherical surface | -34.754 | 1.102 | | |
| 9 | Plane | Diaphragm | 0.301 | | |
| 10 | Spherical surface | 4.618 | 1.201 | 1.72916 | 54.7 |
| 11 | Spherical surface | -3.169 | 0.505 | 1.94594 | 18.0 |
| 12 | Spherical surface | Infinity | 0.152 | | |
| 13 | XY-polynomial surface | 2.237 | 1.097 | 1.53650 | 56.4 |
| 14 | XY-polynomial surface | -1.980 | 0.152 | | |

Fig. 5

| 1ST NUMERICAL EXAMPLE | |
|---|---|
| F number | 2.00 |
| Vertical half angle of view | 90 |
| Horizontal half angle of view | 100 |
| Vertical image height @ Vertical half angle of view | 1.331 |
| Horizontal image height @ Horizontal half angle of view | 1.778 |
| Horizontal image height @ Vertical half angle of view | 1.704 |
| Optical total length | 14.553 |

Fig. 6

| s3 | (1ST NUMERICAL VALUE EXAMPLE) | | | | |
|---|---|---|---|---|---|
| C1 | 0.00000E+00 | C23 | 0.00000E+00 | C45 | 1.57386E-04 |
| C2 | 0.00000E+00 | C24 | 4.13954E-03 | C46 | 0.00000E+00 |
| C3 | 0.00000E+00 | C25 | 0.00000E+00 | C47 | 0.00000E+00 |
| C4 | 2.95191E-01 | C26 | -6.63621E-03 | C48 | 0.00000E+00 |
| C5 | 0.00000E+00 | C27 | 0.00000E+00 | C49 | 0.00000E+00 |
| C6 | 3.54101E-01 | C28 | 7.90925E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.08071E-02 | C33 | 0.00000E+00 | C55 | 0.00000E+00 |
| C12 | 0.00000E+00 | C34 | 0.00000E+00 | C56 | -4.00368E-06 |
| C13 | -1.58087E-02 | C35 | 0.00000E+00 | C57 | 0.00000E+00 |
| C14 | 0.00000E+00 | C36 | 0.00000E+00 | C58 | 5.62387E-05 |
| C15 | -3.03202E-02 | C37 | 1.24297E-04 | C59 | 0.00000E+00 |
| C16 | 0.00000E+00 | C38 | 0.00000E+00 | C60 | 1.19156E-04 |
| C17 | 0.00000E+00 | C39 | -4.73926E-04 | C61 | 0.00000E+00 |
| C18 | 0.00000E+00 | C40 | 0.00000E+00 | C62 | 6.78032E-05 |
| C19 | 0.00000E+00 | C41 | 4.01609E-04 | C63 | 0.00000E+00 |
| C20 | 0.00000E+00 | C42 | 0.00000E+00 | C64 | 1.39034E-05 |
| C21 | 0.00000E+00 | C43 | 1.43083E-03 | C65 | 0.00000E+00 |
| C22 | 7.73512E-04 | C44 | 0.00000E+00 | C66 | 8.73724E-06 |

Fig. 7

| s4 | (1ST NUMERICAL VALUE EXAMPLE) | | | | |
|---|---|---|---|---|---|
| C1 | 0.00000E+00 | C23 | 0.00000E+00 | C45 | -2.85277E-03 |
| C2 | 0.00000E+00 | C24 | 3.75792E-03 | C46 | 0.00000E+00 |
| C3 | 0.00000E+00 | C25 | 0.00000E+00 | C47 | 0.00000E+00 |
| C4 | -6.94261E-02 | C26 | -1.72739E-02 | C48 | 0.00000E+00 |
| C5 | 0.00000E+00 | C27 | 0.00000E+00 | C49 | 0.00000E+00 |
| C6 | -6.44352E-03 | C28 | 1.22753E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -2.66766E-02 | C33 | 0.00000E+00 | C55 | 0.00000E+00 |
| C12 | 0.00000E+00 | C34 | 0.00000E+00 | C56 | -6.26523E-05 |
| C13 | -4.77696E-02 | C35 | 0.00000E+00 | C57 | 0.00000E+00 |
| C14 | 0.00000E+00 | C36 | 0.00000E+00 | C58 | -9.56597E-04 |
| C15 | -5.91813E-02 | C37 | -4.01745E-05 | C59 | 0.00000E+00 |
| C16 | 0.00000E+00 | C38 | 0.00000E+00 | C60 | -2.41948E-03 |
| C17 | 0.00000E+00 | C39 | 6.64997E-04 | C61 | 0.00000E+00 |
| C18 | 0.00000E+00 | C40 | 0.00000E+00 | C62 | -1.43654E-03 |
| C19 | 0.00000E+00 | C41 | 1.92357E-03 | C63 | 0.00000E+00 |
| C20 | 0.00000E+00 | C42 | 0.00000E+00 | C64 | -1.08321E-03 |
| C21 | 0.00000E+00 | C43 | 2.32618E-03 | C65 | 0.00000E+00 |
| C22 | 1.17062E-03 | C44 | 0.00000E+00 | C66 | 1.69770E-04 |

Fig. 8

| s5 | (1ST NUMERICAL VALUE EXAMPLE) | | | | |
|---|---|---|---|---|---|
| C1 | 0.00000E+00 | C23 | 0.00000E+00 | C45 | -3.05738E-03 |
| C2 | 0.00000E+00 | C24 | -1.08918E-02 | C46 | 0.00000E+00 |
| C3 | 0.00000E+00 | C25 | 0.00000E+00 | C47 | 0.00000E+00 |
| C4 | 6.95845E-04 | C26 | -3.16162E-02 | C48 | 0.00000E+00 |
| C5 | 0.00000E+00 | C27 | 0.00000E+00 | C49 | 0.00000E+00 |
| C6 | -5.35408E-02 | C28 | -3.59012E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.89691E-02 | C33 | 0.00000E+00 | C55 | 0.00000E+00 |
| C12 | 0.00000E+00 | C34 | 0.00000E+00 | C56 | 9.13801E-05 |
| C13 | 6.13834E-02 | C35 | 0.00000E+00 | C57 | 0.00000E+00 |
| C14 | 0.00000E+00 | C36 | 0.00000E+00 | C58 | 7.72500E-04 |
| C15 | 2.86703E-02 | C37 | 1.09893E-03 | C59 | 0.00000E+00 |
| C16 | 0.00000E+00 | C38 | 0.00000E+00 | C60 | 6.51241E-04 |
| C17 | 0.00000E+00 | C39 | 2.68622E-03 | C61 | 0.00000E+00 |
| C18 | 0.00000E+00 | C40 | 0.00000E+00 | C62 | 9.30223E-04 |
| C19 | 0.00000E+00 | C41 | 1.07983E-02 | C63 | 0.00000E+00 |
| C20 | 0.00000E+00 | C42 | 0.00000E+00 | C64 | 2.57852E-04 |
| C21 | 0.00000E+00 | C43 | 7.87000E-03 | C65 | 0.00000E+00 |
| C22 | -4.52133E-03 | C44 | 0.00000E+00 | C66 | 1.04248E-03 |

Fig. 9

| s6 | (1ST NUMERICAL VALUE EXAMPLE) | | | | |
|---|---|---|---|---|---|
| C1 | 0.00000E+00 | C23 | 0.00000E+00 | C45 | 1.65937E-04 |
| C2 | 0.00000E+00 | C24 | 7.48260E-03 | C46 | 0.00000E+00 |
| C3 | 0.00000E+00 | C25 | 0.00000E+00 | C47 | 0.00000E+00 |
| C4 | -1.48699E-01 | C26 | 5.72476E-03 | C48 | 0.00000E+00 |
| C5 | 0.00000E+00 | C27 | 0.00000E+00 | C49 | 0.00000E+00 |
| C6 | -1.78741E-01 | C28 | 1.88847E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.38589E-02 | C33 | 0.00000E+00 | C55 | 0.00000E+00 |
| C12 | 0.00000E+00 | C34 | 0.00000E+00 | C56 | -7.97147E-05 |
| C13 | -2.61164E-02 | C35 | 0.00000E+00 | C57 | 0.00000E+00 |
| C14 | 0.00000E+00 | C36 | 0.00000E+00 | C58 | -2.74634E-04 |
| C15 | -1.53452E-02 | C37 | 4.86035E-04 | C59 | 0.00000E+00 |
| C16 | 0.00000E+00 | C38 | 0.00000E+00 | C60 | -4.58862E-04 |
| C17 | 0.00000E+00 | C39 | 1.28724E-03 | C61 | 0.00000E+00 |
| C18 | 0.00000E+00 | C40 | 0.00000E+00 | C62 | -3.10352E-04 |
| C19 | 0.00000E+00 | C41 | 1.84447E-03 | C63 | 0.00000E+00 |
| C20 | 0.00000E+00 | C42 | 0.00000E+00 | C64 | -2.22397E-04 |
| C21 | 0.00000E+00 | C43 | 1.27810E-03 | C65 | 0.00000E+00 |
| C22 | 2.15273E-03 | C44 | 0.00000E+00 | C66 | -2.91594E-06 |

Fig. 10

| | s7 (1ST NUMERICAL VALUE EXAMPLE) |
|---|---|
| K | 0.00000E+00 |
| A4 | -2.21160E-02 |
| A6 | -3.87755E-04 |
| A8 | 7.55913E-04 |
| A10 | -1.87872E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 11

| | s8 (1ST NUMERICAL VALUE EXAMPLE) |
|---|---|
| K | 0.00000E+00 |
| A4 | -1.18645E-02 |
| A6 | -2.18871E-03 |
| A8 | 5.85743E-04 |
| A10 | -8.67397E-05 |
| A12 | 0.00000E+00 |
| A14 | 0.00000E+00 |
| A16 | 0.00000E+00 |
| A18 | 0.00000E+00 |
| A20 | 0.00000E+00 |

Fig. 12

| s13 | (1ST NUMERICAL VALUE EXAMPLE) | | | | |
|---|---|---|---|---|---|
| C1 | 0.00000E+00 | C23 | 0.00000E+00 | C45 | -1.75886E-03 |
| C2 | 0.00000E+00 | C24 | 7.59271E-03 | C46 | 0.00000E+00 |
| C3 | 0.00000E+00 | C25 | 0.00000E+00 | C47 | 0.00000E+00 |
| C4 | -7.41195E-02 | C26 | -6.41181E-04 | C48 | 0.00000E+00 |
| C5 | 0.00000E+00 | C27 | 0.00000E+00 | C49 | 0.00000E+00 |
| C6 | -1.10330E-01 | C28 | 5.14712E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.82122E-02 | C33 | 0.00000E+00 | C55 | 0.00000E+00 |
| C12 | 0.00000E+00 | C34 | 0.00000E+00 | C56 | -6.50119E-04 |
| C13 | -3.58582E-02 | C35 | 0.00000E+00 | C57 | 0.00000E+00 |
| C14 | 0.00000E+00 | C36 | 0.00000E+00 | C58 | -5.91661E-04 |
| C15 | -4.11158E-02 | C37 | 8.20327E-04 | C59 | 0.00000E+00 |
| C16 | 0.00000E+00 | C38 | 0.00000E+00 | C60 | 2.06508E-03 |
| C17 | 0.00000E+00 | C39 | -3.84894E-03 | C61 | 0.00000E+00 |
| C18 | 0.00000E+00 | C40 | 0.00000E+00 | C62 | -8.97380E-04 |
| C19 | 0.00000E+00 | C41 | -1.03151E-02 | C63 | 0.00000E+00 |
| C20 | 0.00000E+00 | C42 | 0.00000E+00 | C64 | -3.10971E-04 |
| C21 | 0.00000E+00 | C43 | -4.05177E-03 | C65 | 0.00000E+00 |
| C22 | 2.45685E-04 | C44 | 0.00000E+00 | C66 | -7.31860E-04 |

Fig. 13

| s14 | (1ST NUMERICAL VALUE EXAMPLE) | | | | |
|---|---|---|---|---|---|
| C1 | 0.00000E+00 | C23 | 0.00000E+00 | C45 | -3.86035E-03 |
| C2 | 0.00000E+00 | C24 | 3.36929E-02 | C46 | 0.00000E+00 |
| C3 | 0.00000E+00 | C25 | 0.00000E+00 | C47 | 0.00000E+00 |
| C4 | 2.71654E-01 | C26 | 1.55547E-02 | C48 | 0.00000E+00 |
| C5 | 0.00000E+00 | C27 | 0.00000E+00 | C49 | 0.00000E+00 |
| C6 | 2.35042E-01 | C28 | 1.21659E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.32132E-02 | C33 | 0.00000E+00 | C55 | 0.00000E+00 |
| C12 | 0.00000E+00 | C34 | 0.00000E+00 | C56 | -5.04937E-04 |
| C13 | 3.59157E-02 | C35 | 0.00000E+00 | C57 | 0.00000E+00 |
| C14 | 0.00000E+00 | C36 | 0.00000E+00 | C58 | 1.38872E-03 |
| C15 | -3.27775E-02 | C37 | 1.17630E-03 | C59 | 0.00000E+00 |
| C16 | 0.00000E+00 | C38 | 0.00000E+00 | C60 | 7.21700E-03 |
| C17 | 0.00000E+00 | C39 | -9.26265E-03 | C61 | 0.00000E+00 |
| C18 | 0.00000E+00 | C40 | 0.00000E+00 | C62 | 5.18999E-03 |
| C19 | 0.00000E+00 | C41 | -2.16317E-02 | C63 | 0.00000E+00 |
| C20 | 0.00000E+00 | C42 | 0.00000E+00 | C64 | 1.53074E-03 |
| C21 | 0.00000E+00 | C43 | -5.82409E-03 | C65 | 0.00000E+00 |
| C22 | 5.57707E-03 | C44 | 0.00000E+00 | C66 | 5.03789E-04 |

Fig. 15

| | | 1ST NUMERICAL VALUE EXAMPLE | 2ND NUMERICAL VALUE EXAMPLE | 3RD NUMERICAL VALUE EXAMPLE | 4TH NUMERICAL VALUE EXAMPLE |
|---|---|---|---|---|---|
| CONDITION (1) | L1(-Z) | | | | 0.014 |
| | L1(+Z) | | 0.018 | | 0.019 |
| | L2(-Z) | 0.039 | 0.448 | 0.276 | |
| | L2(+Z) | 0.039 | 0.624 | 0.260 | |
| | L3(-Z) | 0.062 | 0.131 | 0.119 | 0.047 |
| | L3(+Z) | 0.035 | 0.023 | 0.048 | 0.012 |
| | L7(-Z) | 0.071 | 0.135 | 0.009 | 0.036 |
| | L7(+Z) | 0.092 | 0.164 | | 0.025 |
| CONDITION (2) | L1 | 1.85 | 1.73 | 1.81 | 1.81 |
| CONDITION (3) | L1 | | 54.67 | | 40.93 |
| | L2 | 56.37 | 56.37 | 56.37 | 56.37 |
| | L3 | 56.37 | 56.37 | 56.37 | 56.37 |
| | L7 | 56.37 | 56.37 | 56.37 | |
| CONDITION (4) | L1 | | 1.73 | | 1.81 |
| | L2 | 1.54 | 1.54 | 1.54 | 1.54 |
| | L3 | 1.54 | 1.54 | 1.54 | 1.54 |
| | L7 | 1.54 | 1.54 | 1.54 | |
| CONDITION (5) | | 10.00 | 10.00 | 10.00 | 10.00 |
| CONDITION (6) | | 1.00 | 2.00 | 1.00 | 1.00 |
| CONDITION (7) | | 16.37 | 25.92 | 18.29 | 19.85 |
| | ΔNd1 | 5.70 | 3.60 | 5.10 | 4.70 |
| | ΔNdF | -93.30 | -93.30 | -93.30 | -93.30 |

Fig. 17

| 2ND NUMERICAL EXAMPLE | | | | | |
|---|---|---|---|---|---|
| s | SURFACE TYPE | r | d | nd | vd |
| 1 | Spherical surface | 11.909 | 0.800 | 1.72916 | 54.7 |
| 2 | XY-polynomial surface | 3.300 | 1.640 | | |
| 3 | XY-polynomial surface | -2.945 | 0.800 | 1.53650 | 56.4 |
| 4 | XY-polynomial surface | 1.664 | 2.137 | | |
| 5 | XY-polynomial surface | -1.871 | 1.934 | 1.53650 | 56.4 |
| 6 | XY-polynomial surface | 6.310 | 0.150 | | |
| 7 | Aspherical surface | 4,081.236 | 1.020 | 1.62004 | 36.3 |
| 8 | Aspherical surface | -18.117 | 0.825 | | |
| 9 | Plane | Diaphragm | 0.461 | | |
| 10 | Spherical surface | 3.035 | 1.010 | 1.72916 | 54.7 |
| 11 | Spherical surface | -4.528 | 0.500 | 1.94594 | 18.0 |
| 12 | Spherical surface | 5.637 | 0.594 | | |
| 13 | XY-polynomial surface | 1.664 | 0.930 | 1.53650 | 56.4 |
| 14 | XY-polynomial surface | -1.707 | 0.150 | | |

Fig. 18

| 2ND NUMERICAL EXAMPLE | |
|---|---|
| F number | 2.14 |
| Vertical half angle of view | 90 |
| Horizontal half angle of view | 100 |
| Vertical image height @ Vertical half angle of view | 1.304 |
| Horizontal image height @ Horizontal half angle of view | 1.790 |
| Horizontal image height @ Vertical half angle of view | 1.651 |
| Optical total length | 14.800 |

Fig. 19

| s 2 | (2ND NUMERICAL VALUE EXAMPLE) | | | | |
|---|---|---|---|---|---|
| C1 | 0.00000E+00 | C23 | 0.00000E+00 | C45 | 3.15745E-04 |
| C2 | 0.00000E+00 | C24 | -1.91606E-03 | C46 | 0.00000E+00 |
| C3 | 0.00000E+00 | C25 | 0.00000E+00 | C47 | 0.00000E+00 |
| C4 | -1.07303E-01 | C26 | 2.88977E-03 | C48 | 0.00000E+00 |
| C5 | 0.00000E+00 | C27 | 0.00000E+00 | C49 | 0.00000E+00 |
| C6 | -8.06277E-02 | C28 | -6.81673E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 6.64554E-03 | C33 | 0.00000E+00 | C55 | 0.00000E+00 |
| C12 | 0.00000E+00 | C34 | 0.00000E+00 | C56 | 1.70074E-05 |
| C13 | 2.14319E-02 | C35 | 0.00000E+00 | C57 | 0.00000E+00 |
| C14 | 0.00000E+00 | C36 | 0.00000E+00 | C58 | 2.58686E-05 |
| C15 | -1.18867E-03 | C37 | -1.70181E-04 | C59 | 0.00000E+00 |
| C16 | 0.00000E+00 | C38 | 0.00000E+00 | C60 | 8.78468E-05 |
| C17 | 0.00000E+00 | C39 | 1.98100E-04 | C61 | 0.00000E+00 |
| C18 | 0.00000E+00 | C40 | 0.00000E+00 | C62 | 1.20199E-04 |
| C19 | 0.00000E+00 | C41 | -4.66075E-04 | C63 | 0.00000E+00 |
| C20 | 0.00000E+00 | C42 | 0.00000E+00 | C64 | 3.27716E-05 |
| C21 | 0.00000E+00 | C43 | -7.73691E-05 | C65 | 0.00000E+00 |
| C22 | 7.57813E-04 | C44 | 0.00000E+00 | C66 | 1.03493E-06 |

Fig. 20

| s3 | (2ND NUMERICAL VALUE EXAMPLE) | | | | |
|---|---|---|---|---|---|
| C1 | 0.00000E+00 | C23 | 0.00000E+00 | C45 | -3.54992E-04 |
| C2 | 0.00000E+00 | C24 | 5.06446E-03 | C46 | 0.00000E+00 |
| C3 | 0.00000E+00 | C25 | 0.00000E+00 | C47 | 0.00000E+00 |
| C4 | 5.34213E-01 | C26 | 2.48096E-03 | C48 | 0.00000E+00 |
| C5 | 0.00000E+00 | C27 | 0.00000E+00 | C49 | 0.00000E+00 |
| C6 | 1.12161E-02 | C28 | -2.52662E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -3.82577E-02 | C33 | 0.00000E+00 | C55 | 0.00000E+00 |
| C12 | 0.00000E+00 | C34 | 0.00000E+00 | C56 | 1.02443E-05 |
| C13 | 1.66795E-02 | C35 | 0.00000E+00 | C57 | 0.00000E+00 |
| C14 | 0.00000E+00 | C36 | 0.00000E+00 | C58 | 2.04033E-04 |
| C15 | 5.66944E-02 | C37 | 2.27886E-04 | C59 | 0.00000E+00 |
| C16 | 0.00000E+00 | C38 | 0.00000E+00 | C60 | 4.83298E-04 |
| C17 | 0.00000E+00 | C39 | -1.66724E-03 | C61 | 0.00000E+00 |
| C18 | 0.00000E+00 | C40 | 0.00000E+00 | C62 | 5.20965E-04 |
| C19 | 0.00000E+00 | C41 | -3.35966E-03 | C63 | 0.00000E+00 |
| C20 | 0.00000E+00 | C42 | 0.00000E+00 | C64 | 2.71940E-04 |
| C21 | 0.00000E+00 | C43 | -2.52101E-03 | C65 | 0.00000E+00 |
| C22 | -3.24793E-04 | C44 | 0.00000E+00 | C66 | 4.02570E-05 |

*Fig. 21*

| s 4 | (2ND NUMERICAL VALUE EXAMPLE) | | | | |
|---|---|---|---|---|---|
| C1 | 0.00000E+00 | C23 | 0.00000E+00 | C45 | -1.37600E-02 |
| C2 | 0.00000E+00 | C24 | 1.25318E-02 | C46 | 0.00000E+00 |
| C3 | 0.00000E+00 | C25 | 0.00000E+00 | C47 | 0.00000E+00 |
| C4 | 6.44479E-01 | C26 | 1.50025E-02 | C48 | 0.00000E+00 |
| C5 | 0.00000E+00 | C27 | 0.00000E+00 | C49 | 0.00000E+00 |
| C6 | -2.09774E-01 | C28 | 2.00889E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.81687E-01 | C33 | 0.00000E+00 | C55 | 0.00000E+00 |
| C12 | 0.00000E+00 | C34 | 0.00000E+00 | C56 | -2.91190E-04 |
| C13 | -8.05117E-02 | C35 | 0.00000E+00 | C57 | 0.00000E+00 |
| C14 | 0.00000E+00 | C36 | 0.00000E+00 | C58 | -1.82085E-03 |
| C15 | 4.34070E-02 | C37 | 4.74073E-03 | C59 | 0.00000E+00 |
| C16 | 0.00000E+00 | C38 | 0.00000E+00 | C60 | -7.80395E-03 |
| C17 | 0.00000E+00 | C39 | 2.76998E-03 | C61 | 0.00000E+00 |
| C18 | 0.00000E+00 | C40 | 0.00000E+00 | C62 | 1.21244E-02 |
| C19 | 0.00000E+00 | C41 | 6.86283E-03 | C63 | 0.00000E+00 |
| C20 | 0.00000E+00 | C42 | 0.00000E+00 | C64 | 1.35016E-02 |
| C21 | 0.00000E+00 | C43 | -3.57640E-02 | C65 | 0.00000E+00 |
| C22 | -7.88417E-03 | C44 | 0.00000E+00 | C66 | 2.49642E-03 |

Fig. 22

| s 5 | (2ND NUMERICAL VALUE EXAMPLE) | | | | |
|---|---|---|---|---|---|
| C1 | 0.00000E+00 | C23 | 0.00000E+00 | C45 | 4.05603E-03 |
| C2 | 0.00000E+00 | C24 | 1.38726E-02 | C46 | 0.00000E+00 |
| C3 | 0.00000E+00 | C25 | 0.00000E+00 | C47 | 0.00000E+00 |
| C4 | 1.36421E-01 | C26 | 1.24705E-02 | C48 | 0.00000E+00 |
| C5 | 0.00000E+00 | C27 | 0.00000E+00 | C49 | 0.00000E+00 |
| C6 | 1.85053E-02 | C28 | -6.14483E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.38789E-02 | C33 | 0.00000E+00 | C55 | 0.00000E+00 |
| C12 | 0.00000E+00 | C34 | 0.00000E+00 | C56 | 6.38432E-04 |
| C13 | 2.58285E-02 | C35 | 0.00000E+00 | C57 | 0.00000E+00 |
| C14 | 0.00000E+00 | C36 | 0.00000E+00 | C58 | 2.01363E-03 |
| C15 | 1.72125E-02 | C37 | 1.17018E-04 | C59 | 0.00000E+00 |
| C16 | 0.00000E+00 | C38 | 0.00000E+00 | C60 | 1.83109E-04 |
| C17 | 0.00000E+00 | C39 | 8.58747E-04 | C61 | 0.00000E+00 |
| C18 | 0.00000E+00 | C40 | 0.00000E+00 | C62 | 1.99466E-03 |
| C19 | 0.00000E+00 | C41 | 1.27869E-03 | C63 | 0.00000E+00 |
| C20 | 0.00000E+00 | C42 | 0.00000E+00 | C64 | -2.65708E-03 |
| C21 | 0.00000E+00 | C43 | 1.60933E-03 | C65 | 0.00000E+00 |
| C22 | 6.55777E-04 | C44 | 0.00000E+00 | C66 | -1.93496E-03 |

Fig. 23

| s 6 | (2ND NUMERICAL VALUE EXAMPLE) | | | | |
|---|---|---|---|---|---|
| C1 | 0.00000E+00 | C23 | 0.00000E+00 | C45 | -7.12239E-04 |
| C2 | 0.00000E+00 | C24 | 1.23006E-02 | C46 | 0.00000E+00 |
| C3 | 0.00000E+00 | C25 | 0.00000E+00 | C47 | 0.00000E+00 |
| C4 | -2.18901E-01 | C26 | 1.16600E-02 | C48 | 0.00000E+00 |
| C5 | 0.00000E+00 | C27 | 0.00000E+00 | C49 | 0.00000E+00 |
| C6 | -2.41566E-01 | C28 | 3.12741E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.80010E-02 | C33 | 0.00000E+00 | C55 | 0.00000E+00 |
| C12 | 0.00000E+00 | C34 | 0.00000E+00 | C56 | -8.70060E-05 |
| C13 | -3.23189E-02 | C35 | 0.00000E+00 | C57 | 0.00000E+00 |
| C14 | 0.00000E+00 | C36 | 0.00000E+00 | C58 | -1.57705E-04 |
| C15 | -1.61563E-02 | C37 | -2.46311E-04 | C59 | 0.00000E+00 |
| C16 | 0.00000E+00 | C38 | 0.00000E+00 | C60 | -1.21791E-04 |
| C17 | 0.00000E+00 | C39 | -2.49768E-03 | C61 | 0.00000E+00 |
| C18 | 0.00000E+00 | C40 | 0.00000E+00 | C62 | 1.58370E-04 |
| C19 | 0.00000E+00 | C41 | -4.62687E-03 | C63 | 0.00000E+00 |
| C20 | 0.00000E+00 | C42 | 0.00000E+00 | C64 | 6.98205E-05 |
| C21 | 0.00000E+00 | C43 | -3.01501E-03 | C65 | 0.00000E+00 |
| C22 | 3.39267E-03 | C44 | 0.00000E+00 | C66 | 1.27579E-05 |

Fig. 24

| s7 (2ND NUMERICAL VALUE EXAMPLE) | |
|---|---|
| K | 0.00000E+00 |
| A4 | -9.83025E-03 |
| A6 | 1.47251E-03 |
| A8 | 8.11556E-04 |
| A10 | -1.61915E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 25

| s8 (2ND NUMERICAL VALUE EXAMPLE) | |
|---|---|
| K | 0.00000E+00 |
| A4 | 1.62167E-03 |
| A6 | -3.98350E-03 |
| A8 | 2.63265E-03 |
| A10 | -4.07661E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 26

| s 13 | (2ND NUMERICAL VALUE EXAMPLE) | | | | |
|---|---|---|---|---|---|
| C1 | 0.00000E+00 | C23 | 0.00000E+00 | C45 | 3.30150E-03 |
| C2 | 0.00000E+00 | C24 | -3.89493E-02 | C46 | 0.00000E+00 |
| C3 | 0.00000E+00 | C25 | 0.00000E+00 | C47 | 0.00000E+00 |
| C4 | -2.39143E-01 | C26 | -1.87599E-02 | C48 | 0.00000E+00 |
| C5 | 0.00000E+00 | C27 | 0.00000E+00 | C49 | 0.00000E+00 |
| C6 | -1.33158E-01 | C28 | -8.22285E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -5.61261E-02 | C33 | 0.00000E+00 | C55 | 0.00000E+00 |
| C12 | 0.00000E+00 | C34 | 0.00000E+00 | C56 | -2.59065E-03 |
| C13 | -8.61157E-02 | C35 | 0.00000E+00 | C57 | 0.00000E+00 |
| C14 | 0.00000E+00 | C36 | 0.00000E+00 | C58 | -1.36885E-02 |
| C15 | -5.00422E-02 | C37 | 8.02405E-03 | C59 | 0.00000E+00 |
| C16 | 0.00000E+00 | C38 | 0.00000E+00 | C60 | -3.25844E-02 |
| C17 | 0.00000E+00 | C39 | 3.53520E-02 | C61 | 0.00000E+00 |
| C18 | 0.00000E+00 | C40 | 0.00000E+00 | C62 | -2.72127E-02 |
| C19 | 0.00000E+00 | C41 | 4.09477E-02 | C63 | 0.00000E+00 |
| C20 | 0.00000E+00 | C42 | 0.00000E+00 | C64 | -1.03326E-02 |
| C21 | 0.00000E+00 | C43 | 7.53448E-03 | C65 | 0.00000E+00 |
| C22 | -2.28822E-02 | C44 | 0.00000E+00 | C66 | -2.46781E-03 |

Fig. 27

| s14 | (2ND NUMERICAL VALUE EXAMPLE) | | | | |
|---|---|---|---|---|---|
| C1 | 0.00000E+00 | C23 | 0.00000E+00 | C45 | 3.00580E-04 |
| C2 | 0.00000E+00 | C24 | 4.38632E-02 | C46 | 0.00000E+00 |
| C3 | 0.00000E+00 | C25 | 0.00000E+00 | C47 | 0.00000E+00 |
| C4 | 1.42477E-01 | C26 | 5.62749E-02 | C48 | 0.00000E+00 |
| C5 | 0.00000E+00 | C27 | 0.00000E+00 | C49 | 0.00000E+00 |
| C6 | 3.20530E-01 | C28 | 1.12975E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.71475E-02 | C33 | 0.00000E+00 | C55 | 0.00000E+00 |
| C12 | 0.00000E+00 | C34 | 0.00000E+00 | C56 | 1.83073E-03 |
| C13 | 1.81419E-02 | C35 | 0.00000E+00 | C57 | 0.00000E+00 |
| C14 | 0.00000E+00 | C36 | 0.00000E+00 | C58 | 8.31308E-03 |
| C15 | -1.49461E-02 | C37 | -1.14139E-03 | C59 | 0.00000E+00 |
| C16 | 0.00000E+00 | C38 | 0.00000E+00 | C60 | 1.32383E-02 |
| C17 | 0.00000E+00 | C39 | -6.67252E-03 | C61 | 0.00000E+00 |
| C18 | 0.00000E+00 | C40 | 0.00000E+00 | C62 | 8.05653E-03 |
| C19 | 0.00000E+00 | C41 | -1.05333E-02 | C63 | 0.00000E+00 |
| C20 | 0.00000E+00 | C42 | 0.00000E+00 | C64 | 3.35086E-03 |
| C21 | 0.00000E+00 | C43 | -1.03194E-02 | C65 | 0.00000E+00 |
| C22 | 1.98193E-03 | C44 | 0.00000E+00 | C66 | 2.46224E-04 |

Fig. 31

| s | SURFACE TYPE | r | d | nd | vd |
|---|---|---|---|---|---|
| | 3RD NUMERICAL EXAMPLE | | | | |
| 1 | Spherical surface | 13.862 | 0.800 | 1.80610 | 40.9 |
| 2 | Spherical surface | 3.390 | 1.640 | | |
| 3 | XY-polynomial surface | -3.024 | 0.800 | 1.53650 | 56.4 |
| 4 | XY-polynomial surface | 1.841 | 1.784 | | |
| 5 | XY-polynomial surface | -1.910 | 1.991 | 1.53650 | 56.4 |
| 6 | XY-polynomial surface | 9.716 | 0.151 | | |
| 7 | Aspherical surface | 4.845178 | 1.064 | 1.75520 | 27.5 |
| 8 | Aspherical surface | -233.889 | 0.487 | | |
| 9 | Plane | Diaphragm | 1.059 | | |
| 10 | Spherical surface | 3.682 | 1.040 | 1.72916 | 54.7 |
| 11 | Spherical surface | -2.800 | 0.505 | 1.94594 | 18.0 |
| 12 | Spherical surface | -599.157 | 0.520 | | |
| 13 | XY-polynomial surface | 1.650 | 0.935 | 1.53650 | 56.4 |
| 14 | Aspherical surface | -3.018 | 0.174 | | |

Fig. 32

| 3RD NUMERICAL EXAMPLE | |
|---|---|
| F number | 2.11 |
| Vertical half angle of view | 90 |
| Horizontal half angle of view | 100 |
| Vertical image height @ Vertical half angle of view | 1.312 |
| Horizontal image height @ Horizontal half angle of view | 1.793 |
| Horizontal image height @ Vertical half angle of view | 1.696 |
| Optical total length | 14.800 |

Fig. 33

| s 3 | (3RD NUMERICAL VALUE EXAMPLE) | | | | |
|---|---|---|---|---|---|
| C1 | 0.00000E+00 | C23 | 0.00000E+00 | C45 | -5.36627E-04 |
| C2 | 0.00000E+00 | C24 | 9.06355E-03 | C46 | 0.00000E+00 |
| C3 | 0.00000E+00 | C25 | 0.00000E+00 | C47 | 0.00000E+00 |
| C4 | 4.23936E-01 | C26 | -1.14459E-03 | C48 | 0.00000E+00 |
| C5 | 0.00000E+00 | C27 | 0.00000E+00 | C49 | 0.00000E+00 |
| C6 | 1.29586E-01 | C28 | 2.99713E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -2.04106E-02 | C33 | 0.00000E+00 | C55 | 0.00000E+00 |
| C12 | 0.00000E+00 | C34 | 0.00000E+00 | C56 | -2.19864E-05 |
| C13 | 7.97728E-03 | C35 | 0.00000E+00 | C57 | 0.00000E+00 |
| C14 | 0.00000E+00 | C36 | 0.00000E+00 | C58 | -7.51476E-05 |
| C15 | 9.63650E-03 | C37 | 4.29763E-04 | C59 | 0.00000E+00 |
| C16 | 0.00000E+00 | C38 | 0.00000E+00 | C60 | 8.98623E-05 |
| C17 | 0.00000E+00 | C39 | 1.16422E-04 | C61 | 0.00000E+00 |
| C18 | 0.00000E+00 | C40 | 0.00000E+00 | C62 | 1.72447E-04 |
| C19 | 0.00000E+00 | C41 | -1.24993E-03 | C63 | 0.00000E+00 |
| C20 | 0.00000E+00 | C42 | 0.00000E+00 | C64 | 6.06598E-05 |
| C21 | 0.00000E+00 | C43 | 3.30817E-05 | C65 | 0.00000E+00 |
| C22 | -1.15829E-04 | C44 | 0.00000E+00 | C66 | 3.81583E-05 |

Fig. 34

| s 4 | (3RD NUMERICAL VALUE EXAMPLE) | | | | |
|---|---|---|---|---|---|
| C1 | 0.00000E+00 | C23 | 0.00000E+00 | C45 | -3.36661E-03 |
| C2 | 0.00000E+00 | C24 | 2.53316E-02 | C46 | 0.00000E+00 |
| C3 | 0.00000E+00 | C25 | 0.00000E+00 | C47 | 0.00000E+00 |
| C4 | 5.10610E-02 | C26 | 1.34319E-02 | C48 | 0.00000E+00 |
| C5 | 0.00000E+00 | C27 | 0.00000E+00 | C49 | 0.00000E+00 |
| C6 | -2.54199E-01 | C28 | 8.75127E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -4.85277E-02 | C33 | 0.00000E+00 | C55 | 0.00000E+00 |
| C12 | 0.00000E+00 | C34 | 0.00000E+00 | C56 | -3.52174E-04 |
| C13 | 1.75240E-02 | C35 | 0.00000E+00 | C57 | 0.00000E+00 |
| C14 | 0.00000E+00 | C36 | 0.00000E+00 | C58 | 8.28268E-04 |
| C15 | 8.89593E-03 | C37 | -1.05904E-03 | C59 | 0.00000E+00 |
| C16 | 0.00000E+00 | C38 | 0.00000E+00 | C60 | 3.27111E-03 |
| C17 | 0.00000E+00 | C39 | -2.24326E-03 | C61 | 0.00000E+00 |
| C18 | 0.00000E+00 | C40 | 0.00000E+00 | C62 | 7.08397E-03 |
| C19 | 0.00000E+00 | C41 | -1.02793E-02 | C63 | 0.00000E+00 |
| C20 | 0.00000E+00 | C42 | 0.00000E+00 | C64 | 6.03384E-03 |
| C21 | 0.00000E+00 | C43 | -2.02633E-02 | C65 | 0.00000E+00 |
| C22 | 9.42605E-03 | C44 | 0.00000E+00 | C66 | 6.54932E-04 |

Fig. 35

| s 5 | (3RD NUMERICAL VALUE EXAMPLE) | | | | |
|---|---|---|---|---|---|
| C1 | 0.00000E+00 | C23 | 0.00000E+00 | C45 | 1.85629E-03 |
| C2 | 0.00000E+00 | C24 | -2.52731E-02 | C46 | 0.00000E+00 |
| C3 | 0.00000E+00 | C25 | 0.00000E+00 | C47 | 0.00000E+00 |
| C4 | 4.02151E-02 | C26 | -5.63756E-02 | C48 | 0.00000E+00 |
| C5 | 0.00000E+00 | C27 | 0.00000E+00 | C49 | 0.00000E+00 |
| C6 | -6.26214E-02 | C28 | -1.75030E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 3.08849E-02 | C33 | 0.00000E+00 | C55 | 0.00000E+00 |
| C12 | 0.00000E+00 | C34 | 0.00000E+00 | C56 | 6.61466E-04 |
| C13 | 8.48403E-02 | C35 | 0.00000E+00 | C57 | 0.00000E+00 |
| C14 | 0.00000E+00 | C36 | 0.00000E+00 | C58 | 2.61723E-03 |
| C15 | 3.61993E-02 | C37 | 1.13419E-04 | C59 | 0.00000E+00 |
| C16 | 0.00000E+00 | C38 | 0.00000E+00 | C60 | 4.10254E-03 |
| C17 | 0.00000E+00 | C39 | 3.59278E-03 | C61 | 0.00000E+00 |
| C18 | 0.00000E+00 | C40 | 0.00000E+00 | C62 | 2.78330E-03 |
| C19 | 0.00000E+00 | C41 | 1.51330E-02 | C63 | 0.00000E+00 |
| C20 | 0.00000E+00 | C42 | 0.00000E+00 | C64 | 1.13957E-03 |
| C21 | 0.00000E+00 | C43 | 1.83526E-02 | C65 | 0.00000E+00 |
| C22 | -4.78099E-03 | C44 | 0.00000E+00 | C66 | 7.64929E-04 |

Fig. 36

| s 6 | (3RD NUMERICAL VALUE EXAMPLE) | | | | |
|---|---|---|---|---|---|
| C1 | 0.00000E+00 | C23 | 0.00000E+00 | C45 | -8.54576E-05 |
| C2 | 0.00000E+00 | C24 | 9.45573E-03 | C46 | 0.00000E+00 |
| C3 | 0.00000E+00 | C25 | 0.00000E+00 | C47 | 0.00000E+00 |
| C4 | -2.06857E-01 | C26 | 8.89641E-03 | C48 | 0.00000E+00 |
| C5 | 0.00000E+00 | C27 | 0.00000E+00 | C49 | 0.00000E+00 |
| C6 | -2.48781E-01 | C28 | 3.14379E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.19750E-02 | C33 | 0.00000E+00 | C55 | 0.00000E+00 |
| C12 | 0.00000E+00 | C34 | 0.00000E+00 | C56 | -7.51955E-05 |
| C13 | -2.28956E-02 | C35 | 0.00000E+00 | C57 | 0.00000E+00 |
| C14 | 0.00000E+00 | C36 | 0.00000E+00 | C58 | -6.79895E-05 |
| C15 | -1.38620E-02 | C37 | 1.93716E-04 | C59 | 0.00000E+00 |
| C16 | 0.00000E+00 | C38 | 0.00000E+00 | C60 | -2.50954E-04 |
| C17 | 0.00000E+00 | C39 | -4.74735E-04 | C61 | 0.00000E+00 |
| C18 | 0.00000E+00 | C40 | 0.00000E+00 | C62 | -3.34113E-04 |
| C19 | 0.00000E+00 | C41 | 5.58440E-04 | C63 | 0.00000E+00 |
| C20 | 0.00000E+00 | C42 | 0.00000E+00 | C64 | -1.78779E-05 |
| C21 | 0.00000E+00 | C43 | 2.75793E-05 | C65 | 0.00000E+00 |
| C22 | 3.40003E-03 | C44 | 0.00000E+00 | C66 | 5.34277E-07 |

Fig. 37

| s7 (3RD NUMERICAL VALUE EXAMPLE) | |
|---|---|
| K | 0.00000E+00 |
| A4 | -1.48290E-02 |
| A6 | 2.68779E-03 |
| A8 | 1.40775E-03 |
| A10 | -2.87034E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 38

| s8 (3RD NUMERICAL VALUE EXAMPLE) | |
|---|---|
| K | 0.00000E+00 |
| A4 | -8.98024E-03 |
| A6 | -1.15303E-03 |
| A8 | 2.42266E-03 |
| A10 | -4.62352E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 39

| s 13 | (3RD NUMERICAL VALUE EXAMPLE) | | | | |
|---|---|---|---|---|---|
| C1 | 0.00000E+00 | C23 | 0.00000E+00 | C45 | 3.78416E-03 |
| C2 | 0.00000E+00 | C24 | -6.52700E-02 | C46 | 0.00000E+00 |
| C3 | 0.00000E+00 | C25 | 0.00000E+00 | C47 | 0.00000E+00 |
| C4 | -3.24157E-01 | C26 | -5.89542E-02 | C48 | 0.00000E+00 |
| C5 | 0.00000E+00 | C27 | 0.00000E+00 | C49 | 0.00000E+00 |
| C6 | -3.36571E-01 | C28 | -1.81868E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -9.29975E-02 | C33 | 0.00000E+00 | C55 | 0.00000E+00 |
| C12 | 0.00000E+00 | C34 | 0.00000E+00 | C56 | -3.91231E-03 |
| C13 | -1.91815E-01 | C35 | 0.00000E+00 | C57 | 0.00000E+00 |
| C14 | 0.00000E+00 | C36 | 0.00000E+00 | C58 | -1.76932E-02 |
| C15 | -9.23538E-02 | C37 | 5.52356E-03 | C59 | 0.00000E+00 |
| C16 | 0.00000E+00 | C38 | 0.00000E+00 | C60 | -3.69686E-02 |
| C17 | 0.00000E+00 | C39 | 1.93378E-02 | C61 | 0.00000E+00 |
| C18 | 0.00000E+00 | C40 | 0.00000E+00 | C62 | -3.84493E-02 |
| C19 | 0.00000E+00 | C41 | 3.01455E-02 | C63 | 0.00000E+00 |
| C20 | 0.00000E+00 | C42 | 0.00000E+00 | C64 | -1.89498E-02 |
| C21 | 0.00000E+00 | C43 | 1.86415E-02 | C65 | 0.00000E+00 |
| C22 | -2.23614E-02 | C44 | 0.00000E+00 | C66 | -3.64861E-03 |

Fig. 40

| | s14 (3RD NUMERICAL VALUE EXAMPLE) |
|---|---|
| K | 0.00000E+00 |
| A4 | -7.04296E-02 |
| A6 | 8.50594E-03 |
| A8 | -1.09527E-03 |
| A10 | -5.76817E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 44

| 4TH NUMERICAL EXAMPLE | | | | | |
|---|---|---|---|---|---|
| s | SURFACE TYPE | r | d | nd | vd |
| 1 | XY-polynomial surface | 28.277 | 0.800 | 1.80610 | 40.9 |
| 2 | XY-polynomial surface | 3.445 | 2.222 | | |
| 3 | Aspherical surface | 6.684 | 0.800 | 1.74409 | 44.6 |
| 4 | Aspherical surface | 1.768 | 1.731 | | |
| 5 | XY-polynomial surface | -1.875 | 1.515 | 1.53251 | 56.3 |
| 6 | XY-polynomial surface | -3.929 | 0.154 | | |
| 7 | Aspherical surface | 2.970753 | 1.020 | 1.69359 | 33.1 |
| 8 | Aspherical surface | 61.277 | 0.926 | | |
| 9 | Plane | Diaphragm | 0.527 | | |
| 10 | Spherical surface | 2.769 | 1.010 | 1.72916 | 54.7 |
| 11 | Spherical surface | -3.100 | 0.500 | 1.92286 | 20.9 |
| 12 | Spherical surface | 5.077 | 0.361 | | |
| 13 | XY-polynomial surface | 2.707 | 0.930 | 1.53251 | 56.3 |
| 14 | XY-polynomial surface | -2.798 | 0.150 | | |

Fig. 45

| 4TH NUMERICAL EXAMPLE | |
|---|---|
| F number | 1.97 |
| Vertical half angle of view | 90 |
| Horizontal half angle of view | 100 |
| Vertical image height @ Vertical half angle of view | 1.342 |
| Horizontal image height @ Horizontal half angle of view | 1.788 |
| Horizontal image height @ Vertical half angle of view | 1.637 |
| Optical total length | 14.496 |

Fig. 46

| s1 | (4TH NUMERICAL VALUE EXAMPLE) | | | | |
|---|---|---|---|---|---|
| C1 | 0.00000E+00 | C23 | 0.00000E+00 | C45 | 0.00000E+00 |
| C2 | 0.00000E+00 | C24 | 0.00000E+00 | C46 | 0.00000E+00 |
| C3 | 0.00000E+00 | C25 | 0.00000E+00 | C47 | 0.00000E+00 |
| C4 | 5.46766E-02 | C26 | 0.00000E+00 | C48 | 0.00000E+00 |
| C5 | 0.00000E+00 | C27 | 0.00000E+00 | C49 | 0.00000E+00 |
| C6 | 4.15263E-02 | C28 | 0.00000E+00 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 6.07071E-05 | C33 | 0.00000E+00 | C55 | 0.00000E+00 |
| C12 | 0.00000E+00 | C34 | 0.00000E+00 | C56 | 0.00000E+00 |
| C13 | 1.64034E-04 | C35 | 0.00000E+00 | C57 | 0.00000E+00 |
| C14 | 0.00000E+00 | C36 | 0.00000E+00 | C58 | 0.00000E+00 |
| C15 | -9.49751E-05 | C37 | 0.00000E+00 | C59 | 0.00000E+00 |
| C16 | 0.00000E+00 | C38 | 0.00000E+00 | C60 | 0.00000E+00 |
| C17 | 0.00000E+00 | C39 | 0.00000E+00 | C61 | 0.00000E+00 |
| C18 | 0.00000E+00 | C40 | 0.00000E+00 | C62 | 0.00000E+00 |
| C19 | 0.00000E+00 | C41 | 0.00000E+00 | C63 | 0.00000E+00 |
| C20 | 0.00000E+00 | C42 | 0.00000E+00 | C64 | 0.00000E+00 |
| C21 | 0.00000E+00 | C43 | 0.00000E+00 | C65 | 0.00000E+00 |
| C22 | 0.00000E+00 | C44 | 0.00000E+00 | C66 | 0.00000E+00 |

Fig. 47

| s2 | (4TH NUMERICAL VALUE EXAMPLE) | | | | |
|---|---|---|---|---|---|
| C1 | 0.00000E+00 | C23 | 0.00000E+00 | C45 | -8.65565E-06 |
| C2 | 0.00000E+00 | C24 | 7.86394E-04 | C46 | 0.00000E+00 |
| C3 | 0.00000E+00 | C25 | 0.00000E+00 | C47 | 0.00000E+00 |
| C4 | -3.27276E-02 | C26 | 9.01983E-04 | C48 | 0.00000E+00 |
| C5 | 0.00000E+00 | C27 | 0.00000E+00 | C49 | 0.00000E+00 |
| C6 | -5.06800E-02 | C28 | 1.47235E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.51350E-03 | C33 | 0.00000E+00 | C55 | 0.00000E+00 |
| C12 | 0.00000E+00 | C34 | 0.00000E+00 | C56 | 2.73613E-06 |
| C13 | 4.29661E-03 | C35 | 0.00000E+00 | C57 | 0.00000E+00 |
| C14 | 0.00000E+00 | C36 | 0.00000E+00 | C58 | 1.97382E-05 |
| C15 | 1.94120E-03 | C37 | 1.11520E-05 | C59 | 0.00000E+00 |
| C16 | 0.00000E+00 | C38 | 0.00000E+00 | C60 | 4.80636E-05 |
| C17 | 0.00000E+00 | C39 | -3.86823E-05 | C61 | 0.00000E+00 |
| C18 | 0.00000E+00 | C40 | 0.00000E+00 | C62 | 6.03628E-05 |
| C19 | 0.00000E+00 | C41 | -2.18688E-04 | C63 | 0.00000E+00 |
| C20 | 0.00000E+00 | C42 | 0.00000E+00 | C64 | 2.79846E-05 |
| C21 | 0.00000E+00 | C43 | -1.65732E-04 | C65 | 0.00000E+00 |
| C22 | 1.96178E-04 | C44 | 0.00000E+00 | C66 | 3.59404E-06 |

Fig. 48

| s3 (4TH NUMERICAL VALUE EXAMPLE) | |
|---|---|
| K | 0.00000E+00 |
| A4 | -8.05715E-03 |
| A6 | 2.26627E-04 |
| A8 | 8.07249E-05 |
| A10 | -5.44031E-06 |
| A12 | 0.00000E+00 |
| A14 | 0.00000E+00 |
| A16 | 0.00000E+00 |
| A18 | 0.00000E+00 |
| A20 | 0.00000E+00 |

Fig. 49

| s4 (4TH NUMERICAL VALUE EXAMPLE) | |
|---|---|
| K | 0.00000E+00 |
| A4 | -3.38241E-02 |
| A6 | -2.15047E-03 |
| A8 | 8.63175E-04 |
| A10 | -2.28773E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 50

| s 5 | (4TH NUMERICAL VALUE EXAMPLE) | | | | |
|---|---|---|---|---|---|
| C1 | 0.00000E+00 | C23 | 0.00000E+00 | C45 | 2.33180E-03 |
| C2 | 0.00000E+00 | C24 | -1.71142E-02 | C46 | 0.00000E+00 |
| C3 | 0.00000E+00 | C25 | 0.00000E+00 | C47 | 0.00000E+00 |
| C4 | 1.15542E-02 | C26 | -1.44407E-02 | C48 | 0.00000E+00 |
| C5 | 0.00000E+00 | C27 | 0.00000E+00 | C49 | 0.00000E+00 |
| C6 | -2.18653E-02 | C28 | -6.55210E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.42211E-02 | C33 | 0.00000E+00 | C55 | 0.00000E+00 |
| C12 | 0.00000E+00 | C34 | 0.00000E+00 | C56 | 3.52449E-04 |
| C13 | 4.15127E-02 | C35 | 0.00000E+00 | C57 | 0.00000E+00 |
| C14 | 0.00000E+00 | C36 | 0.00000E+00 | C58 | 1.25470E-03 |
| C15 | 1.68443E-02 | C37 | 1.62488E-03 | C59 | 0.00000E+00 |
| C16 | 0.00000E+00 | C38 | 0.00000E+00 | C60 | 2.30618E-03 |
| C17 | 0.00000E+00 | C39 | 8.76424E-03 | C61 | 0.00000E+00 |
| C18 | 0.00000E+00 | C40 | 0.00000E+00 | C62 | 2.12682E-03 |
| C19 | 0.00000E+00 | C41 | 1.22395E-02 | C63 | 0.00000E+00 |
| C20 | 0.00000E+00 | C42 | 0.00000E+00 | C64 | 7.69669E-04 |
| C21 | 0.00000E+00 | C43 | 7.30812E-03 | C65 | 0.00000E+00 |
| C22 | -4.69488E-03 | C44 | 0.00000E+00 | C66 | 9.78347E-05 |

Fig. 51

| s 6 | (4TH NUMERICAL VALUE EXAMPLE) | | | | |
|---|---|---|---|---|---|
| C1 | 0.00000E+00 | C23 | 0.00000E+00 | C45 | 2.17083E-04 |
| C2 | 0.00000E+00 | C24 | 7.62777E-03 | C46 | 0.00000E+00 |
| C3 | 0.00000E+00 | C25 | 0.00000E+00 | C47 | 0.00000E+00 |
| C4 | -2.68038E-02 | C26 | 8.97315E-03 | C48 | 0.00000E+00 |
| C5 | 0.00000E+00 | C27 | 0.00000E+00 | C49 | 0.00000E+00 |
| C6 | -3.62374E-02 | C28 | 2.71574E-03 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.47698E-02 | C33 | 0.00000E+00 | C55 | 0.00000E+00 |
| C12 | 0.00000E+00 | C34 | 0.00000E+00 | C56 | -1.09559E-04 |
| C13 | -3.14874E-02 | C35 | 0.00000E+00 | C57 | 0.00000E+00 |
| C14 | 0.00000E+00 | C36 | 0.00000E+00 | C58 | -4.39395E-04 |
| C15 | -1.65700E-02 | C37 | 4.73587E-04 | C59 | 0.00000E+00 |
| C16 | 0.00000E+00 | C38 | 0.00000E+00 | C60 | -6.99602E-04 |
| C17 | 0.00000E+00 | C39 | 1.48620E-03 | C61 | 0.00000E+00 |
| C18 | 0.00000E+00 | C40 | 0.00000E+00 | C62 | -4.88208E-04 |
| C19 | 0.00000E+00 | C41 | 1.37675E-03 | C63 | 0.00000E+00 |
| C20 | 0.00000E+00 | C42 | 0.00000E+00 | C64 | -2.30980E-04 |
| C21 | 0.00000E+00 | C43 | 5.69944E-04 | C65 | 0.00000E+00 |
| C22 | 2.19467E-03 | C44 | 0.00000E+00 | C66 | -4.97608E-05 |

Fig. 52

| | s7 (4TH NUMERICAL VALUE EXAMPLE) |
|---|---|
| K | 0.00000E+00 |
| A4 | -1.65057E-02 |
| A6 | 1.39754E-03 |
| A8 | 5.40362E-04 |
| A10 | -5.73269E-05 |
| A12 | 0.00000E+00 |
| A14 | 0.00000E+00 |
| A16 | 0.00000E+00 |
| A18 | 0.00000E+00 |
| A20 | 0.00000E+00 |

Fig. 53

| | s8 (4TH NUMERICAL VALUE EXAMPLE) |
|---|---|
| K | 0.00000E+00 |
| A4 | 6.40482E-04 |
| A6 | -4.62686E-03 |
| A8 | 2.06992E-03 |
| A10 | -2.15719E-04 |
| A12 | 0.00000E+00 |
| A14 | 0.00000E+00 |
| A16 | 0.00000E+00 |
| A18 | 0.00000E+00 |
| A20 | 0.00000E+00 |

Fig. 54

| s 13 | (4TH NUMERICAL VALUE EXAMPLE) | | | | |
|---|---|---|---|---|---|
| C1 | 0.00000E+00 | C23 | 0.00000E+00 | C45 | 6.19306E-03 |
| C2 | 0.00000E+00 | C24 | -2.89367E-02 | C46 | 0.00000E+00 |
| C3 | 0.00000E+00 | C25 | 0.00000E+00 | C47 | 0.00000E+00 |
| C4 | -4.21322E-02 | C26 | -3.18613E-02 | C48 | 0.00000E+00 |
| C5 | 0.00000E+00 | C27 | 0.00000E+00 | C49 | 0.00000E+00 |
| C6 | -1.43858E-02 | C28 | -1.01394E-02 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -3.56873E-02 | C33 | 0.00000E+00 | C55 | 0.00000E+00 |
| C12 | 0.00000E+00 | C34 | 0.00000E+00 | C56 | -2.32987E-03 |
| C13 | -6.93562E-02 | C35 | 0.00000E+00 | C57 | 0.00000E+00 |
| C14 | 0.00000E+00 | C36 | 0.00000E+00 | C58 | -1.64997E-02 |
| C15 | -3.12939E-02 | C37 | 3.17429E-03 | C59 | 0.00000E+00 |
| C16 | 0.00000E+00 | C38 | 0.00000E+00 | C60 | -3.63982E-02 |
| C17 | 0.00000E+00 | C39 | 1.71589E-02 | C61 | 0.00000E+00 |
| C18 | 0.00000E+00 | C40 | 0.00000E+00 | C62 | -4.12580E-02 |
| C19 | 0.00000E+00 | C41 | 3.31541E-02 | C63 | 0.00000E+00 |
| C20 | 0.00000E+00 | C42 | 0.00000E+00 | C64 | -2.07712E-02 |
| C21 | 0.00000E+00 | C43 | 2.38735E-02 | C65 | 0.00000E+00 |
| C22 | -9.87298E-03 | C44 | 0.00000E+00 | C66 | -4.36674E-03 |

Fig. 55

| s 14 | (4TH NUMERICAL VALUE EXAMPLE) | | | | |
|---|---|---|---|---|---|
| C1 | 0.00000E+00 | C23 | 0.00000E+00 | C45 | -1.61601E-03 |
| C2 | 0.00000E+00 | C24 | 5.56813E-04 | C46 | 0.00000E+00 |
| C3 | 0.00000E+00 | C25 | 0.00000E+00 | C47 | 0.00000E+00 |
| C4 | 8.84749E-02 | C26 | 7.42821E-04 | C48 | 0.00000E+00 |
| C5 | 0.00000E+00 | C27 | 0.00000E+00 | C49 | 0.00000E+00 |
| C6 | 1.16262E-01 | C28 | 5.56212E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -9.05041E-03 | C33 | 0.00000E+00 | C55 | 0.00000E+00 |
| C12 | 0.00000E+00 | C34 | 0.00000E+00 | C56 | -6.65460E-04 |
| C13 | -2.53901E-02 | C35 | 0.00000E+00 | C57 | 0.00000E+00 |
| C14 | 0.00000E+00 | C36 | 0.00000E+00 | C58 | -4.36310E-03 |
| C15 | -1.39857E-02 | C37 | 7.54260E-04 | C59 | 0.00000E+00 |
| C16 | 0.00000E+00 | C38 | 0.00000E+00 | C60 | -7.29442E-03 |
| C17 | 0.00000E+00 | C39 | -2.28833E-03 | C61 | 0.00000E+00 |
| C18 | 0.00000E+00 | C40 | 0.00000E+00 | C62 | -9.60938E-03 |
| C19 | 0.00000E+00 | C41 | -4.70020E-03 | C63 | 0.00000E+00 |
| C20 | 0.00000E+00 | C42 | 0.00000E+00 | C64 | -4.10506E-03 |
| C21 | 0.00000E+00 | C43 | -4.34123E-03 | C65 | 0.00000E+00 |
| C22 | -3.19093E-03 | C44 | 0.00000E+00 | C66 | -7.98633E-04 |

LENS SYSTEM, IMAGING DEVICE, AND IMAGING SYSTEM INCLUDING A LENS ELEMENT HAVING A FREE-CURVE SURFACE

BACKGROUND

1. Technical Field

The present disclosure relates to a lens system, an imaging device, and an imaging system.

2. Related Art

WO 2003/010599 A discloses a method for capturing a panoramic image using an image sensor having an oblong shape. In WO 2003/010599 A, a circular image is converted into a quadrilateral image by using a toric lens as a fisheye objective lens. Thereby, in the image sensor having an oblong shape, a panoramic image can be captured by forming a quadrilateral image on a quadrilateral imaging element.

SUMMARY

The present disclosure provides a lens system, an imaging device, and an imaging system capable of enlarging, in an image formed on an imaging element, a vicinity of a center and ensuring a wide angle of view.

The lens system according to the present disclosure is a lens system that forms an image on an imaging element. The lens system includes: a first lens element, a second lens element, and a third lens element, which are arranged in order from an object side to an image surface side along an optical axis; and a diaphragm. In the lens system, at least one of the first lens element and the second lens element has a free-curved surface that is asymmetric with respect to the optical axis. The first lens element has a shape of a surface facing the object side, the shape being convex toward the object side. The second lens element has a shape of a surface facing the image surface side, the shape being convex toward the object side. The third lens element has a shape of a surface facing the object side, the shape being convex toward the image surface side. The lens system has one or more free-curved surfaces closer to the image surface side than the diaphragm.

The imaging device according to the present disclosure includes the lens system and an imaging element. The imaging element captures an image formed via the lens system.

The imaging system according to the present disclosure includes the imaging device and an image processor. The image processor performs image processing on an image captured by the imaging device.

According to the present disclosure, there can be provided a lens system, an imaging device, and an imaging system capable of enlarging, in an image formed on an imaging element, a vicinity of a center and ensuring a wide angle of view.

BRIEF DESCRIPTION OF THE DRAWINGS

FIG. 4 is a table showing surface data of the lens system of the first numerical value example;

FIG. 5 is a table showing various data of the lens system of the first numerical value example;

FIG. 6 is a table showing free-curved surface data of a third surface in the lens system of the first numerical value example;

FIG. 7 is a table showing free-curved surface data of a fourth surface in the lens system of the first numerical value example;

FIG. 8 is a table showing free-curved surface data of a fifth surface in the lens system of the first numerical value example;

FIG. 9 is a table showing free-curved surface data of a sixth surface in the lens system of the first numerical value example;

FIG. 10 is a table showing aspherical surface data of a seventh surface in the lens system of the first numerical value example;

FIG. 11 is a table showing aspherical surface data of an eighth surface in the lens system of the first numerical value example;

FIG. 12 is a table showing free-curved surface data of a 13th surface in the lens system of the first numerical value example;

FIG. 13 is a table showing free-curved surface data of a 14th surface in the lens system of the first numerical value example;

FIG. 15 is a table showing satisfaction of various conditions in the lens system of the first embodiment;

FIG. 17 is a table showing surface data of a lens system of a second numerical value example;

FIG. 18 is a table showing various data of the lens system of the second numerical value example;

FIG. 19 is a table showing free-curved surface data of a second surface in the lens system of the second numerical value example;

FIG. 20 is a table showing free-curved surface data of a third surface in the lens system of the second numerical value example;

FIG. 21 is a table showing free-curved surface data of a fourth surface in the lens system of the second numerical value example;

FIG. 22 is a table showing free-curved surface data of a fifth surface in the lens system of the second numerical value example;

FIG. 23 is a table showing free-curved surface data of a sixth surface in the lens system of the second numerical value example;

FIG. 24 is a table showing aspherical surface data of a seventh surface in the lens system of the second numerical value example;

FIG. 25 is a table showing aspherical surface data of an eighth surface in the lens system of the second numerical value example;

FIG. 26 is a table showing free-curved surface data of a 13th surface in the lens system of the second numerical value example;

FIG. 27 is a table showing free-curved surface data of a 14th surface in the lens system of the second numerical value example;

FIG. 31 is a table showing surface data of a lens system of a third numerical value example;

FIG. 32 is a table showing various data of the lens system of the third numerical value example;

FIG. 33 is a table showing free-curved surface data of a third surface in the lens system of the third numerical value example;

FIG. 34 is a table showing free-curved surface data of a fourth surface in the lens system of the third numerical value example;

FIG. 35 is a table showing free-curved surface data of a fifth surface in the lens system of the third numerical value example;

FIG. 36 is a table showing free-curved surface data of a sixth surface in the lens system of the third numerical value example;

FIG. 37 is a table showing aspherical surface data of a seventh surface in the lens system of the third numerical value example;

FIG. 38 is a table showing aspherical surface data of an eighth surface in the lens system of the third numerical value example;

FIG. 39 is a table showing free-curved surface data of a 13th surface in the lens system of the third numerical value example;

FIG. 40 is a table showing aspherical surface data of a 14th surface in the lens system of the third numerical value example;

FIG. 44 is a table showing surface data of a lens system of a fourth numerical value example;

FIG. 45 is a table showing various data of the lens system of the fourth numerical value example;

FIG. 46 is a table showing free-curved surface data of a first surface in the lens system of the fourth numerical value example;

FIG. 47 is a table showing free-curved surface data of a second surface in the lens system of the fourth numerical value example;

FIG. 48 is a table showing aspherical surface data of a third surface in the lens system of the fourth numerical value example;

FIG. 49 is a table showing aspherical surface data of a fourth surface in the lens system of the fourth numerical value example;

FIG. 50 is a table showing free-curved surface data of a fifth surface in the lens system of the fourth numerical value example;

FIG. 51 is a table showing free-curved surface data of a sixth surface in the lens system of the fourth numerical value example;

FIG. 52 is a table showing aspherical surface data of a seventh surface in the lens system of the fourth numerical value example;

FIG. 53 is a table showing aspherical surface data of an eighth surface in the lens system of the fourth numerical value example;

FIG. 54 is a table showing free-curved surface data of a 13th surface in the lens system of the fourth numerical value example;

FIG. 55 is a table showing free-curved surface data of a 14th surface in the lens system of the fourth numerical value example;

DESCRIPTION OF EMBODIMENTS

Hereinafter, the embodiments will be described in detail with reference to the drawings as appropriate. However, more detailed description than necessary may be omitted. For example, detailed descriptions of already well-known matters or duplicate descriptions of substantially the same configurations may be omitted. This is to avoid unnecessary redundancy in the following description and to facilitate understanding by those skilled in the art.

It should be noted that the applicant provides the accompanying drawings and the following description for those skilled in the art to fully understand the present disclosure, and it is not intended to limit the subject matters described in the appended claims by them.

First Embodiment

A first embodiment of a lens system and an imaging device according to the present disclosure will be described below with reference to the drawings.

1. Imaging Device

Figure 1:
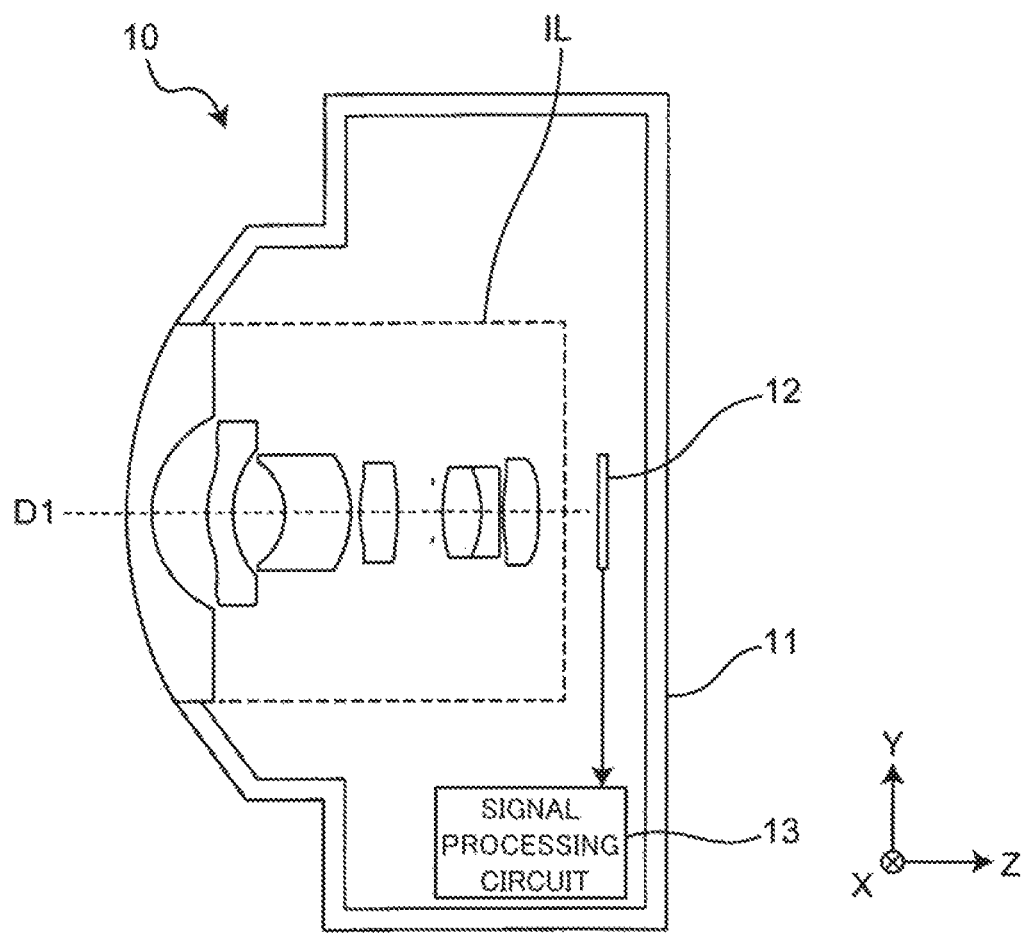
FIG. 1 is a diagram showing a configuration of an imaging device according to a first embodiment of the present disclosure.

The imaging device according to the present embodiment will be described with reference to FIG. 1. FIG. 1 is a diagram showing a configuration of imaging device 10 according to the present embodiment.

As shown in FIG. 1, imaging device 10 according to the present embodiment includes, within casing 11, lens system IL, imaging element 12, and signal processing circuit 13, for example. Imaging device 10 is a camera that captures images of objects including various subjects. Hereinafter, a direction of optical axis D1 in imaging device 10 is defined as a Z-direction, a horizontal direction orthogonal to the Z-direction is defined as an X-direction, and a vertical direction orthogonal to the Z-direction and X-direction is defined as a Y-direction.

Lens system IL takes in light incident from an outside of imaging device 10, and forms an image of a subject or the like by the taken-in light on an imaging surface of imaging element 12. Lens system IL includes, for example, a refractive optical system. Details of lens system IL will be described later. Hereinafter, a +Z side of lens system IL is defined as an image surface side, whereas a −Z side is defined as an object side, as shown in FIG. 1.

Imaging element 12 is a CCD or CMOS image sensor, for example. Imaging element 12 has the imaging surface on which a plurality of pixels are two-dimensionally arranged at equal intervals. Imaging element 12 captures an image formed on the imaging surface via lens system IL, and generates an image signal indicating the captured image. The imaging surface of imaging element 12 has a quadrilateral shape having longer sides and shorter sides, for example. It is assumed that the longer sides of imaging element 12 are parallel to the X-direction and the shorter sides are parallel to the Y-direction.

Signal processing circuit 13 is an example of an image processor that performs predetermined image processing on the image signal from imaging element 12. For example, the image processing is gamma correction, distortion correction or the like. Imaging device 10 may further include an interface circuit or the like for outputting the image signal, after being subjected to the signal processing by signal processing circuit 13, to external equipment. Additionally, the image processor, such as signal processing circuit 13, may be provided outside imaging device 10.

In imaging device 10 as described above, lens system IL of the present embodiment achieves image formation in which a vicinity of a center of the captured image is enlarged on the imaging surface of imaging element 12 with a wide angle of view being ensured. Hereinafter, details of lens system IL of the present embodiment will be described.

2. Lens System

As an example in which lens system IL according to the present embodiment is specifically implemented, each of first to fourth examples of lens system IL will be described below.

2-1. First Example

Lens system IL1 according to a first example will be described with reference to FIGS. 2 to 14.

Figure 2:
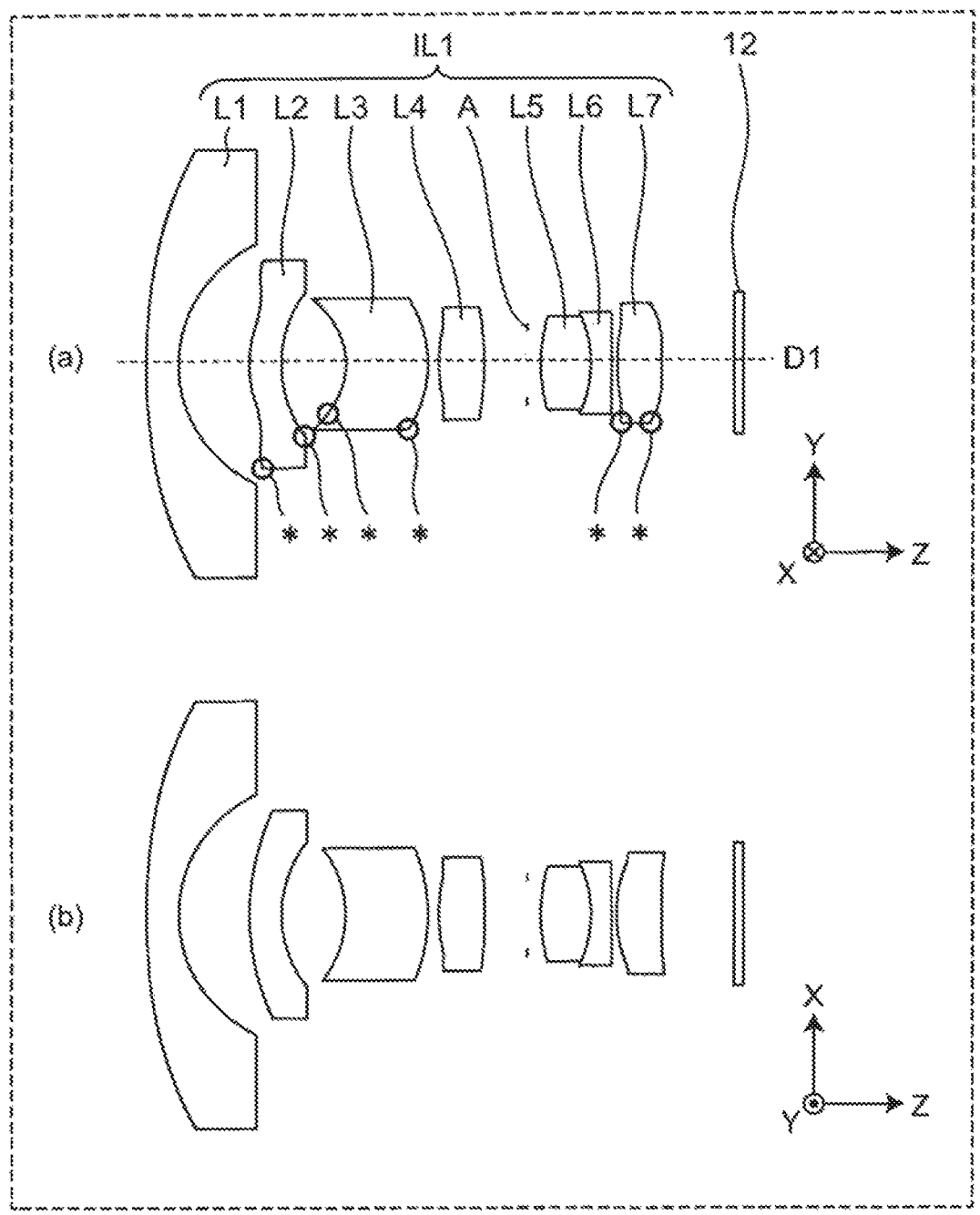
FIG. 2 is a lens layout diagram showing a configuration of a lens system according to a first example.

FIG. 2 is a lens layout diagram showing a configuration of lens system IL1 according to the first example. Each of following lens layout diagrams shows an arrangement of various lenses when lens system IL1 is in an infinity focusing state, for example. A part (a) of FIG. 2 shows a lens layout diagram in a YZ cross-section of lens system IL1 of the present example. A part (b) of FIG. 2 shows a lens layout diagram in an XZ cross-section of lens system IL1. Each of the YZ cross-section and the XZ cross-section is a virtual cross-section along optical axis D1 of lens system IL1.

In the part (a) of FIG. 2, a curved surface marked with a symbol "*" indicates a free-curved surface. The free-curved surface is a rotationally asymmetric curved surface with respect to optical axis D1, and is, e.g., an XY polynomial surface described later (see a mathematical expression (E1)). Note that various symbols are omitted in the part (b) of FIG. 2.

Lens system IL1 of the present example includes seven lens elements L1 to L7 and diaphragm A. In lens system IL1, first to seventh lens elements L1 to L7 are arranged in order from the object side to the image surface side along the optical axis D1, as shown in the part (a) of FIG. 2. Diaphragm A is an aperture diaphragm.

In the present example, first lens element L1 is a spherical lens having a negative meniscus shape. First lens element L1 is arranged such that a convex surface faces the object side. Second lens element L2 has the free-curved surfaces on both sides each facing the object side and the image surface side such that power (i.e., refractive power) is negative, for example. Shapes of surfaces on both sides of second lens element L2 are convex toward the object side. Third lens element L3 has the free-curved surfaces on both sides with negative power, for example. Shapes of surfaces on both sides of third lens element L3 are convex toward the image surface side.

Fourth lens element L4 includes an aspherical lens and has a biconvex shape, for example. Diaphragm A is arranged between fourth lens element L4 and fifth lens element L5. Fifth lens element L5 is a spherical lens having a biconvex shape. Fifth lens element L5 and sixth lens element L6 are joined with each other. Sixth lens element L6 is a spherical lens having a negative meniscus shape.

In the present example, seventh lens element L7 has the free-curved surfaces on both sides with positive power, for example. A shape of a surface facing the object side in seventh lens element L7 is convex toward the object side. A shape of a surface facing the image surface side in seventh lens element L7 is convex toward the object side in the XZ cross-section as shown in the part (a) of FIG. 2, while the surface is convex toward the image surface side in the YZ cross-section as shown in the part (b) of FIG. 2.

In lens system IL1 of the present example as described above, the shape of the surface of first lens element L1, which is closest to the object side, is convex toward the object side. Thus, light can be taken into lens system IL1 from a wide range on the object side, so that a wide angle of view can be easily ensured. The shape of the surface facing the image surface side in second lens element L2, which is convex toward the object side, and the shape of the surface facing the object side in third lens element L3, which is convex toward the image surface side, form an air lens between second and third lens elements L2, L3.

Further, the free-curved surface is provided to second lens element L2 among first and second lens elements L1, L2, and the free-curved surface is provided to seventh lens element L7 closer to the image surface side than diaphragm A. According to lens system IL1 described above, an image in which a vicinity of a center is enlarged can be obtained on the image surface by controlling, asymmetrically with respect to optical axis D1, rays of light taken in from the object side. The effects of such lens system IL1 will be described with reference to FIG. 3.

Figure 3:
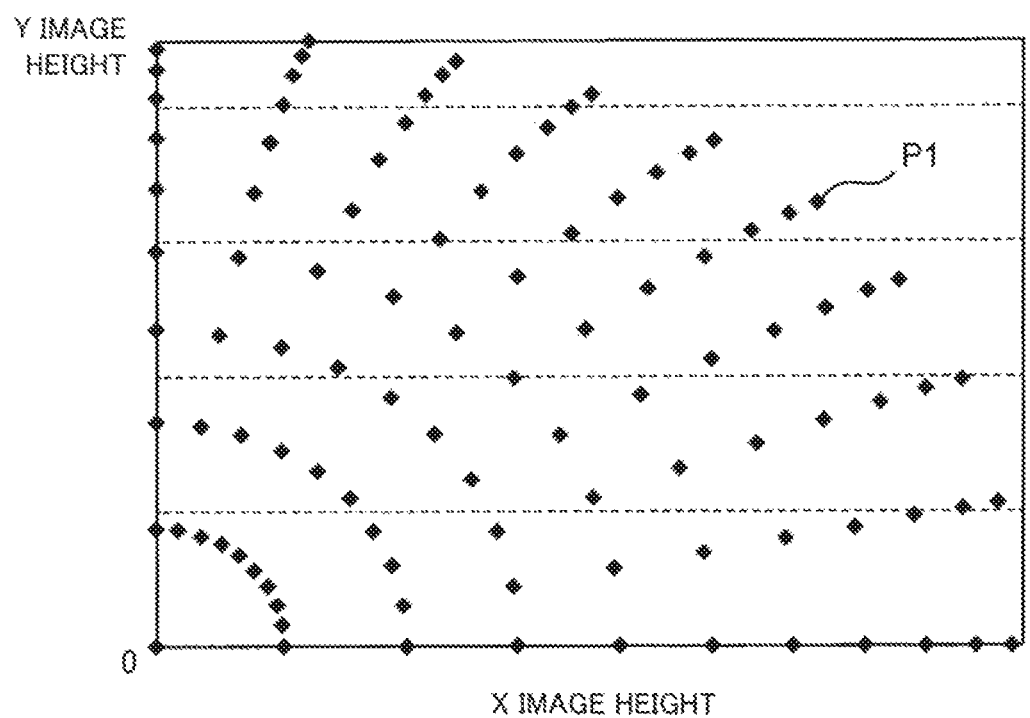
FIG. 3 is a scatter plot showing a relationship between an angle of view and an image point in the lens system of a first numerical value example.

FIG. 3 is a scatter plot showing a relationship between an angle of view and image point P1 in lens system IL1 of the present example. In FIG. 3, image point P1 at which incident light forms an image on the image surface is plotted for each predetermined angular width in an entire angle of view of lens system IL1. The angular width is set to 10°. Lens system IL1 is set to be in an infinity focusing state.

The plot of FIG. 3 is based on a first numerical value example in which lens system IL1 of the first example is numerically implemented. The first numerical value example of lens system IL1 will be described later. In FIG. 3, image points P1 in a first quadrant are illustrated on an XY plane of the image surface whose origin is a position of optical axis D1. Since lens system IL1 of the present example has line symmetry with respect to an X-axis and a Y-axis, the same applies to second to fourth quadrants as in FIG. 3.

According to FIG. 3, in lens system IL1 of the present example, a number of image points P1 for the each angular width is 10 along the X-axis and 9 along the Y-axis. That is, wide angles of view are achieved, in which a half angle of view in the X direction is 100° and a half angle of view in the Y-direction is 90°. Further, a distance between image points P1 becomes larger as it gets closer to origin O in both the X direction and the Y direction. That is, an image, in which an area within a predetermined range in the vicinity of the center is enlarged more than an end portion, can be formed on the image surface.

From the relative perspective to central enlargement of an image as described above, more of the pixels on the imaging surface of imaging element 12 are allocated (i.e., more densely) to the enlarged area near the center than to other areas. Therefore, imaging device 10 of the present embodiment can capture an image of an area closer to the center with higher resolution while ensuring a wide angle of view. According to FIG. 3, especially in the Y direction, a change in the distance between image points P1 is remarkable. Thereby, imaging device 10 according to the present embodiment can capture an image of the vicinity of the center in the vertical direction with high resolution, as well as a wide range in the vertical direction is able to be captured.

For example, it is considered that if anamorphic aspherical surfaces are used instead of all the free-curved surfaces in lens system IL1 described above, rotational symmetry around origin O causes performance in a diagonal direction between the X-axis and the Y-axis to fall short. In contrast to this, by using the non-rotationally symmetric free-curved surfaces, lens system IL of the present embodiment can make the distance between image points P1 larger as it is closer to the center while ensuring a wide angle of view even in the diagonal direction, as shown in FIG. 3.

A first numerical value example corresponding to lens system IL1 of the first example as described above will be described with reference to FIGS. 4 to 14.

FIG. 4 is a table showing surface data of lens system IL1 in the first numerical value example. For each of surfaces s1 to s14 arranged in order from the object side in lens system IL1, the surface data in FIG. 4 show a type of the respective surfaces, a radius of curvature r and surface spacing d in mm, and refractive indices nd and Abbe's numbers vd with respect to a d-line in the lens element. The types of the surfaces include a spherical surface, an aspherical surface, and an XY polynomial surface as the free-curved surface.

FIG. 5 is a table showing various data of lens system IL1 in the first numerical value example. The various data in FIG. 5 show an F number, a vertical half angle of view, a horizontal half angle of view, a vertical image height at the vertical half angle of view, a horizontal image height at the horizontal half angle of view, a horizontal image height at the vertical half angle of view, and an optical total length. A unit of each of the various image heights and the optical total length is "mm", and a unit of each half angle of view is "°".

FIG. 6 is a table showing free-curved surface data of third surface s3 in lens system IL1 of the first numerical value example. The free-curved surface data in FIG. 6 shows, for the surface facing the object side in second lens element L2, coefficients of an XY polynomial that defines the XY polynomial surface as the free-curved surface. The XY polynomial is expressed by a following mathematical expression (E1).

[Mathematical expression 1]

$$z = \frac{cr^2}{1 + \sqrt{1-(1+k)c^2r^2}} + \sum_{j=2}^{66} c_j x^p y^q \quad (E1)$$

$$j = \frac{(p+q)^2 + p + 3q}{2} + 1$$

In the above mathematical expression (E1), c is a peak curvature, k is a conic constant, and cj is a coefficient. In a second term on a right side of the above mathematical expression (E1), j is an integer of, e.g., 2 or more and 66 or less, and a sum for each j is calculated. According to the above mathematical expression (E1), a sag amount z at a position of (x,y) coordinates on a target plane is defined.

FIGS. 7 to 9 are tables showing free-curved surface data of fourth to sixth surfaces s4 to s6 in lens system IL1 of the first numerical value example, respectively. The free-curved surface data in FIG. 7 show, for the surface facing the image surface side in second lens element L2, the coefficients of the mathematical expression (E1), similarly to FIG. 6. Similarly, the free-curved surface data in FIGS. 8, 9 show the coefficients of the surfaces each facing the object side and the image surface side in third lens element L3, respectively.

FIGS. 10, 11 are tables showing aspherical surface data of seventh and eighth surfaces s7, s8 in lens system IL1 of the first numerical value example, respectively. Aspherical surface data in FIGS. 10, 11 show, for the surfaces each facing the object side and the image surface side in fourth lens element L4, coefficients of a following mathematical expression (E2) that defines a shape of an aspherical surface, respectively.

[Mathematical expression 2]

$$z = \frac{h^2/r}{1 + \sqrt{1-(1+\kappa)(h/r)^2}} + \sum A_n h^n \quad (E2)$$

In the above mathematical expression (E2), h is a height in a radial direction, K is a conic constant, and An is an aspherical coefficient of degree n. In a second term on a right side of the above mathematical expression (E2), n is, e.g., an even number of 4 or more and 20 or less, and a sum for each n is calculated. According to the above mathematical expression (E1), a sag amount z at height h in the radial direction on the surface is defined with rotational symmetry.

FIGS. 12, 13 are tables showing free-curved surface data of 13th and 14th surfaces s13, s14 in lens system IL1 of the first numerical value example, respectively. The free-curved surface data in FIGS. 12, 13 show, for the surfaces each facing the object side and the image surface side in seventh lens element L7, the coefficients of the mathematical expression (E1), respectively, similarly to FIG. 6.

Figure 14:
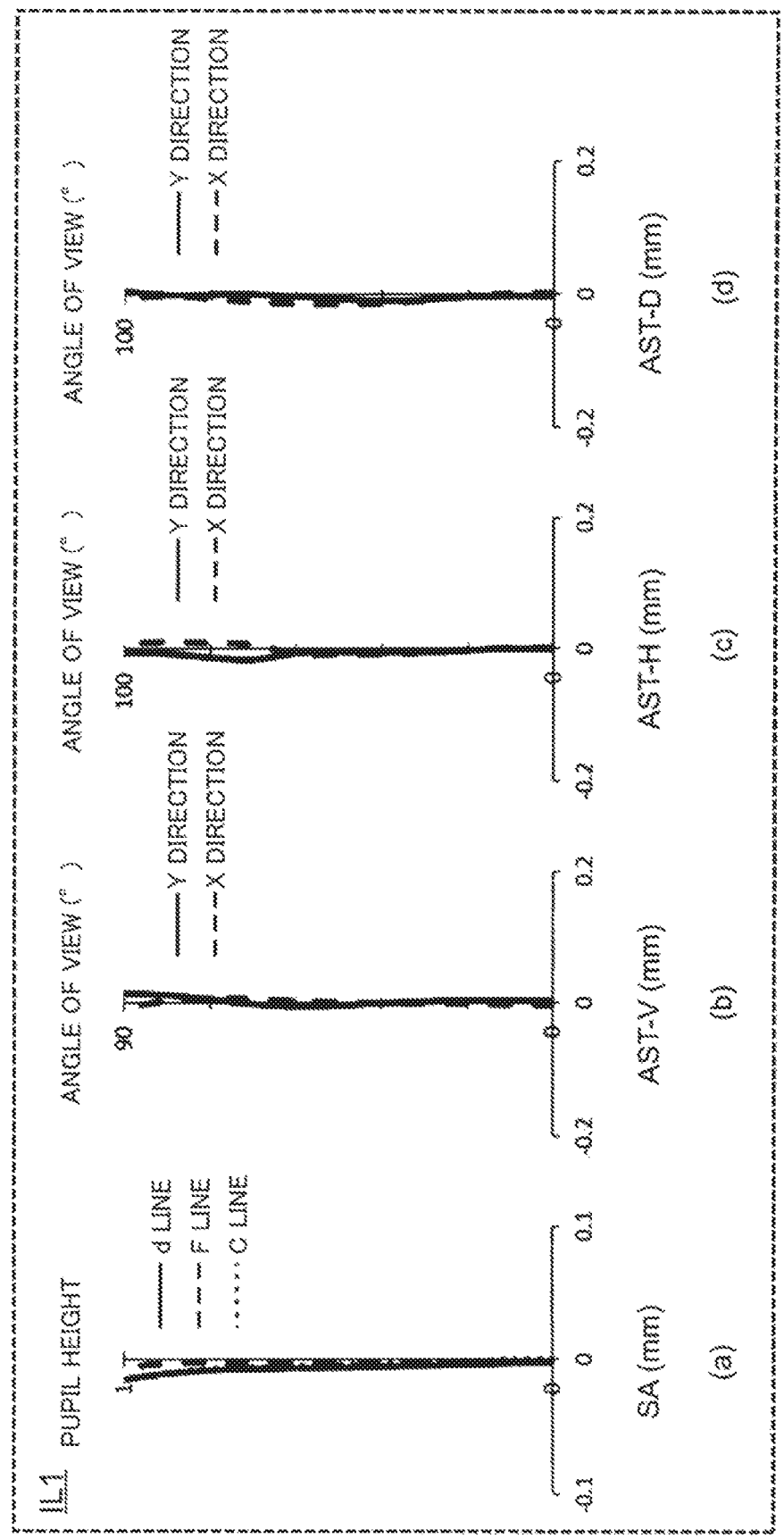
FIG. 14 is an aberration diagram showing various aberrations in the lens system of the first numerical value example.

FIG. 14 is an aberration diagram showing various aberrations of lens system IL1 in the present example. Following aberration diagrams illustrates various longitudinal aberrations in the infinity focusing state. A part (a) of FIG. 14 shows spherical aberration "SA" in lens system IL1. Parts (b), (c), (d) of FIG. 14 show astigmatism "AST-V" in the Y-direction, astigmatism "AST-H" in the X-direction, and astigmatism "AST-D" in the diagonal direction, respectively.

Each of horizontal axes of the parts (a) to (d) of FIG. 14 is expressed in mm. A vertical axis of the part (a) of FIG. 14 is based on a pupil height. The part (a) of FIG. 14 shows characteristic curves, with respect to the d-line, an F-line, and a c-line, of the spherical aberration. Vertical axes of the parts (b) to (d) of FIG. 14 are based on the half angles of view. The parts (b) to (d) of FIG. 14 show characteristic curves of the astigmatisms with respect to the XZ cross-section or the YZ along the X-direction or the Y-direction and optical axis D1, respectively.

The present embodiment uses only the even-number terms of x and y in the XY polynomial on each free-curved surface, as shown in FIGS. 6 to 9, 12, 13, for example. Therefore, the aberration "AST-D" in the diagonal direction and the like are the same in any one of the first to fourth quadrants.

3-2. Various Conditions

Various conditions satisfied by lens system IL according to the present embodiment will be described by using the first numerical value example of lens system IL1 described above, and with reference to FIG. 15.

FIG. 15 is a table showing satisfaction of various conditions in lens system IL of the present embodiment. The table shown in FIG. 15 shows that lens system IL of the present embodiment satisfies following conditional expressions (1) to (7) in each of first to fourth numerical value examples. In FIG. 15, "−Z" denoted next to lens elements L1 to L3, L7 indicates that it is the surface facing the object side, and "+Z" indicates that it is the surface facing the image surface side. For example, "L7(+Z)" indicates that it is the surface, facing the image surface side, of seventh lens element L7.

Conditional expression (1) is expressed as follows:

$$0.01 < |Smax - Smin|/IH < 0.65 \quad (1)$$

where, Smax is a maximum sag amount, that is, a maximum value of the sag amount of the free-curved surface at a height of 60% of the largest image height. Smin is a minimum sag amount, that is, a minimum value of the sag amount of the same free-curved surface at the height of 60% of the largest image height. IH is a length corresponding to the height of 60% of the largest image height.

In the above conditional expression (1), the maximum sag amount and the minimum sag amount are measured in an entire circumference at the above height. For example, when the free-curved surface has line symmetry with respect to the X-axis and the Y-axis, the maximum sag amount and the minimum sag amount are sag amounts at the height on the X-axis and the Y-axis. The sag amount has a positive or negative value depending on the direction in the Z-direction, for example.

Below a lower limit of the conditional expression (1), a difference between the sag amounts is too small, so that it is difficult to obtain an effect of taking in a wide angle of view with the vicinity of the center enlarging. It is also necessary to increase a number of lenses, which causes a cost increase. On the other hand, above an upper limit of the conditional expression (1), disadvantages may be caused in producing lens system IL1. It is also difficult to properly control the astigmatism and image surface curvature in each of the vertical, diagonal, and horizontal directions.

According to lens system IL1 of the first numerical value example, all free-curved surfaces L2(−Z) to L7(+Z) satisfy the conditional expression (1), as shown in FIG. 15. According to the conditional expression (1), the vicinity of the center can be easily enlarged with the angle of view being widened, by changing the sag amount on the free-curved surface to tune the free-curved surface in a rotationally asymmetric manner. In lens system IL of the present embodiment, not all the free-curved surfaces need to satisfy the conditional expression (1).

A conditional expression (2) is expressed as follows:

$$Nd1 > 1.7 \quad (2)$$

where, Nd1 is a refractive index, on the d-line, of first lens element L1. For example, first lens element L1 includes a glass element. For example, lens system IL1 of the first numerical value example satisfies the conditional expression (2), as shown in FIG. 15.

The conditional expression (2) is a condition for increasing the refractive index of first lens element L1 such that a ray of light incident from the outside can be greatly bent. Below a lower limit of the conditional expression (2), it is difficult to obtain a performance for which the vicinity of the center is enlarged with the angle of view being widened, such as a difficulty taking in light from a wide range in first lens element L1. Alternatively, it is necessary to increase the number of lenses, which causes a cost increase.

A conditional expression (3) is expressed as follows:

$$40 < Vd < 60 \quad (3)$$

where, Vd is an Abbe's number of a free-curved surface lens. The free-curved surface lens is a lens element having at least one free-curved surface. For example, in the first numerical value example, each of free-curved surface lenses L2, L3, L7 satisfies the conditional expression (3), as shown in FIG. 15.

According to the conditional expression (3), an imaging performance of lens system IL1 against a temperature change can be suitably obtained by setting the Abbe's number of the free-curved surface lens to an appropriate range. Above an upper limit of or below a lower limit of the conditional expression (3), it is difficult to ensure the imaging performance upon a temperature change. Additionally, chromatic aberration drastically changes upon a temperature change, so that it is difficult to control properly.

A conditional expression (4) is expressed as follows:

$$Nd > 1.5 \quad (4)$$

where, Nd is a refractive index, on the d-line, of a free-curved surface lens. For example, in the first numerical value example, each of free-curved surface lenses L2, L3, L7 satisfies the conditional expression (4), as shown in FIG. 15.

According to the conditional expression (4), a ray of light can be easily controlled in a rotationally asymmetric manner by using a free-curved surface lens having a high refractive index in lens system IL1. Below a lower limit of the conditional expression (4), it is difficult to obtain the above-described effect. Alternatively, it is necessary to increase the number of the lenses, which causes a cost increase. Additionally, it is difficult to properly control the spherical aberration and coma aberration while enlarging the center and taking in a vertical angle of view.

A conditional expression (5) is expressed as follows:

$$H\omega - V\omega < 20 \quad (5)$$

where, Hω is a half angle of view in the horizontal direction (i.e., the X-direction). Vω is a half angle of view in the vertical direction (i.e., the Y-direction).

In the first numerical value example, Hω=100° and Vω=90° as shown in FIG. 5, and hence the conditional expression (5) is satisfied. Above an upper limit of the conditional expression (5), it is difficult to obtain a wide-angle effect in both the horizontal and vertical directions.

A conditional expression (6) is expressed as follows:

$$0 \leq |NN-NP| \leq 2 \quad (6)$$

where, NN is a number of lens elements each having a free-curved surface and negative power. NP is a number of lens elements each having a free-curved surface and positive power. Whether the power of NN and NP in the above conditional expression (6) are positive or negative may be determined in either the YZ cross-section or the XZ-cross section, for example.

As to the first numerical value example, the power of two of free-curved surface lenses L2, L3, L7 are negative, whereas the power of one of them is positive. Thus, the conditional expression (6) is satisfied, as shown in FIG. 15. According to the conditional expression (6), the imaging performance of lens system IL1 against a temperature change can be easily obtained. Above an upper limit of or below a lower limit of the conditional expression (6), it is difficult to obtain the imaging performance upon a temperature change. Chromatic aberration drastically changes upon a temperature change, so that it is difficult to perform proper control. It is also difficult to properly control a back focus shift that occurs upon a temperature change.

A conditional expression (7) is expressed as follows:

$$|\Delta NdF/\Delta Nd1| \quad (7)$$

where, $\Delta Nd1$ is a refractive index change rate, on the d-line, of first lens element L1, with respect to a temperature change from 25° C. $\Delta NdF$ is a refractive index change rate, on the d-line, of a lens element having a free-curved surface, with respect to a temperature change from 25° C.

The refractive index change rates $\Delta Nd1$, $\Delta NdF$ in each of the numerical value examples are shown in FIG. 15. For example, lens system IL1 of the first numerical value example satisfies the conditional expression (7). According to the conditional expression (7), the imaging performance of the lens system IL1 against a temperature change can be suitably obtained. Below a lower limit of the conditional expression (7), it is difficult to obtain the imaging performance upon a temperature change. Chromatic aberration drastically changes upon a temperature change, so that it is difficult to perform proper control. It is also difficult to properly control a back focus shift that occurs upon a temperature change.

2-3. Second Example

Lens system IL according to the present embodiment can be implemented in various forms without being limited to lens system IL1 of the first example described above. Lens system IL2 of a second example will be described with reference to FIGS. 16 to 29.

Figure 16:
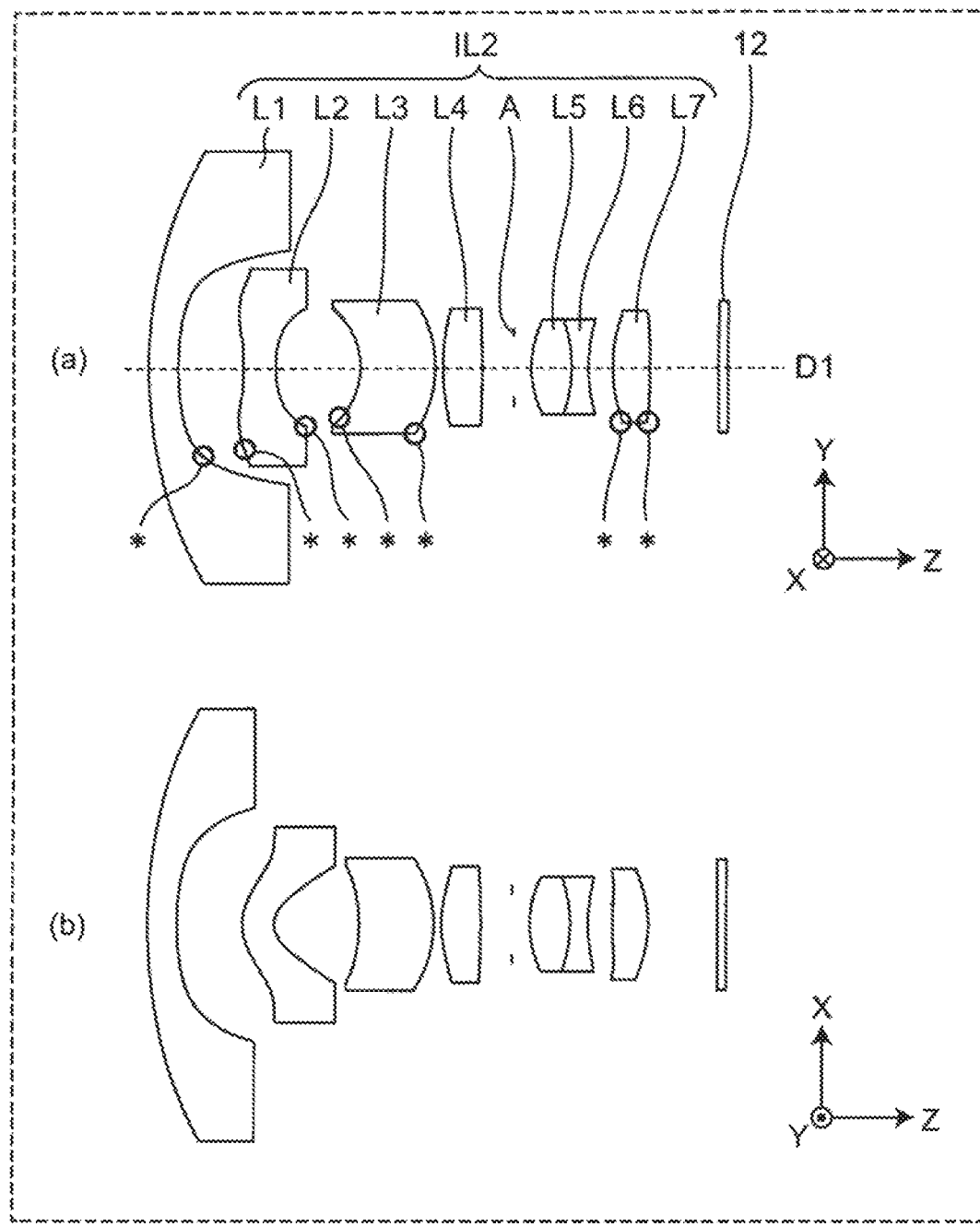
FIG. 16 is a lens layout diagram showing a configuration of a lens system according to a second example.

FIG. 16 shows a configuration of lens system IL2 according to the second example. Parts (a), (b) of FIG. 16 are lens layout diagrams of lens system IL2, similarly to the parts (a), (b) of FIG. 2, respectively.

Lens system IL2 of the second example has similar configuration to that of the first example, wherein shapes of various lens elements L1 to L7 and the like are changed. For example, a free-curved surface is provided as a surface facing the image surface side in first lens element L1. A numerical value example corresponding to lens system IL2 of the second example is shown in FIGS. 17 to 29.

FIG. 17 is a table showing surface data of lens system IL2 in a second numerical value example. FIG. 18 is a table showing various data of lens system IL2 in the present example. FIGS. 17, 18 show respective data, similarly to FIGS. 4, 5 of the first numerical value example, respectively.

FIGS. 19 to 23 are tables showing free-curved surface data of second to sixth surfaces s2 to s6 in lens system IL2 of the present example, respectively. The free-curved surface data in FIG. 19 shows, for the surface facing the image surface side in first lens element L1, the coefficients of the mathematical expression (E1), similarly to the first numerical value example. FIGS. 20 to 23 show each free-curved surface data, similarly to FIGS. 6 to 9, respectively.

FIGS. 24, 25 respectively show aspherical surface data of seventh and eighth surfaces s7, s8 in lens system IL2 of the present example, similarly to FIGS. 10, 11. FIGS. 26, 27 respectively show free-curved surface data of 13th and 14th surfaces s13, s14 in lens system IL2, similarly to FIGS. 12, 13.

Figure 28:
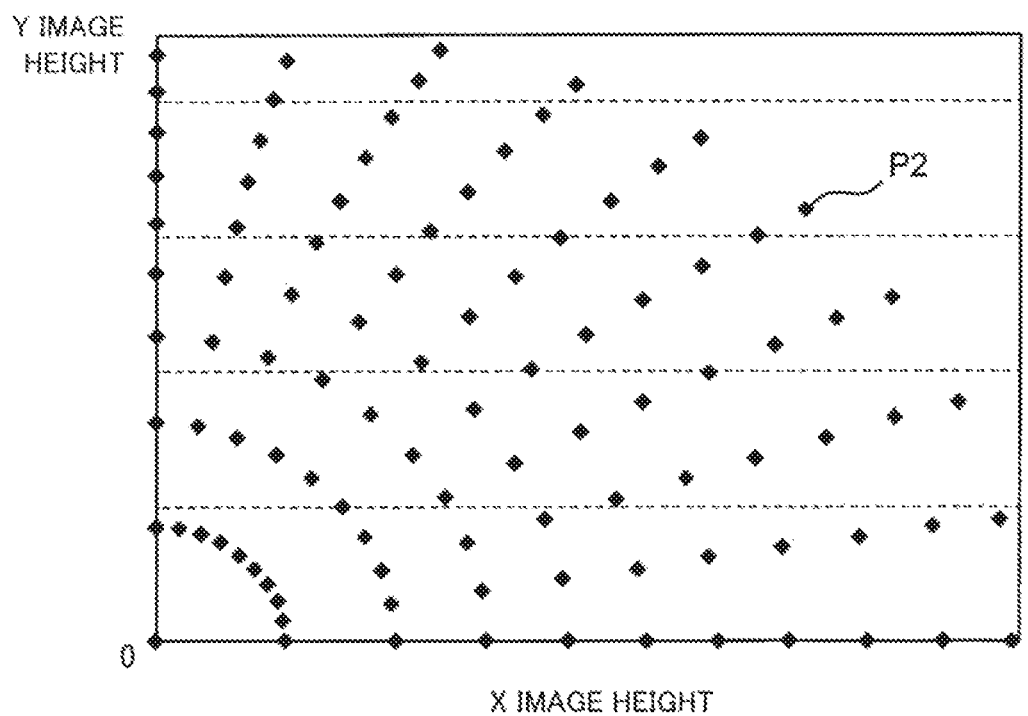
FIG. 28 is a scatter plot showing a relationship between an angle of view and an image point in the lens system of the second numerical value example.

Based on the second numerical value example described above, FIG. 28 shows a relationship between an angle of view and image point P2 in lens system IL2 of the present example. Also with lens system IL2 of the present example, image formation in which a vicinity of a center is enlarged with a wide angle of view being ensured can be achieved, as shown in FIG. 28, similarly to the first example.

Figure 29:
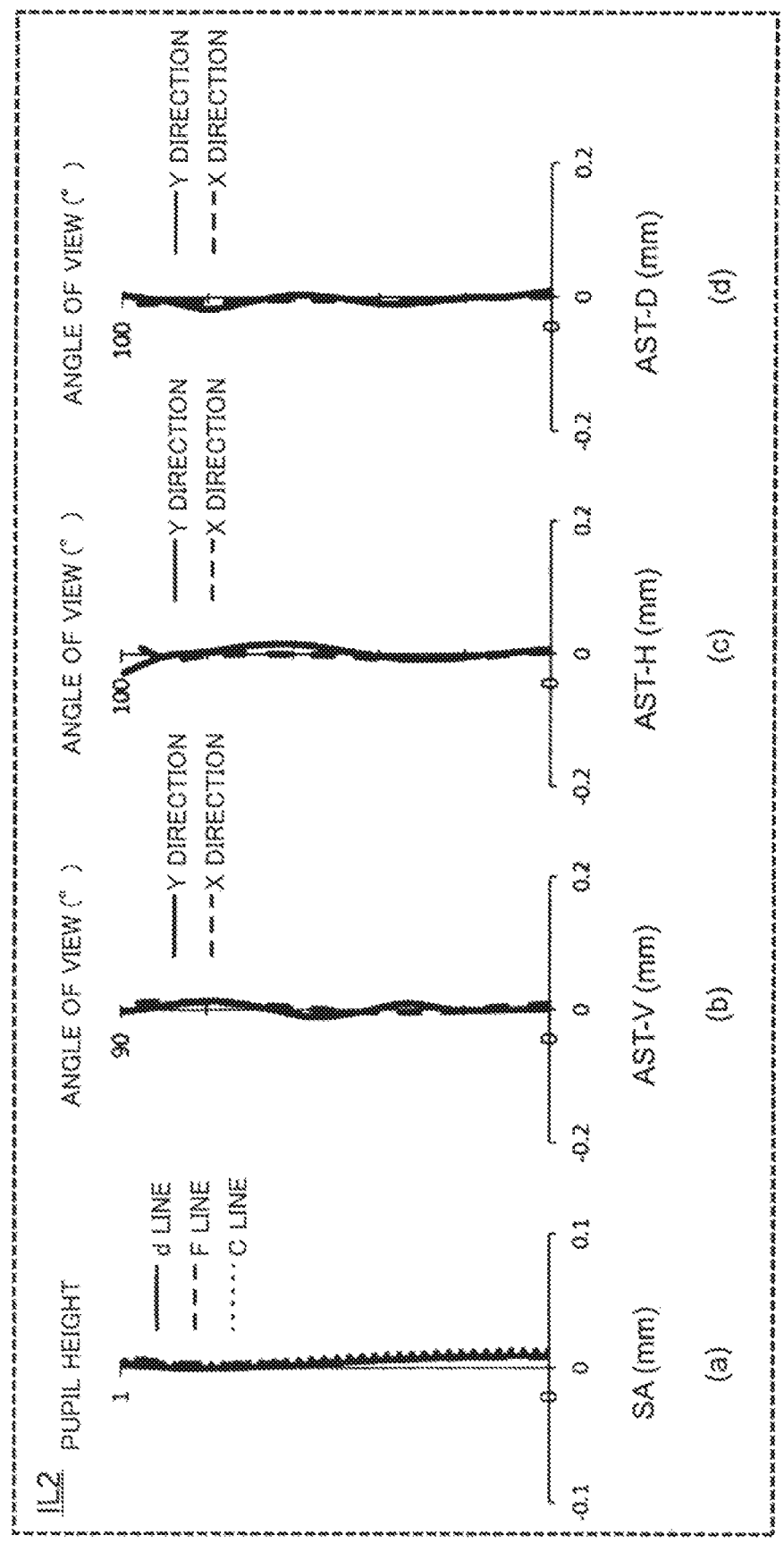
FIG. 29 is an aberration diagram showing various aberrations in the lens system of the second numerical value example.

FIG. 29 shows various aberrations of lens system IL2 in the present example. Parts (a), (b), (c), (d) of FIG. 29 show aberration diagrams of lens system IL2 in the present example, similarly to the parts (a) to (d) of FIG. 14, respectively.

Lens system IL2 of the present example satisfies the respective conditional expressions (1) to (7) described above, as shown in FIG. 15. For example, regarding the conditional expression (1), free-curved surface L2(+Z) in the present example, facing the image surface side in second lens element L2, has a value of "0.623" near the upper limit value. Also with this, the same effects as those of the first example can be obtained.

2-4. Third Example

In lens system IL of the present embodiment, the number of the free-curved surfaces closer to the image surface side than the diaphragm A may be one or more. In a third example, an example of lens system IL3, having one free-curved surface on the side closer to the image surface side than diaphragm A, will be described with reference to FIGS. 30 to 42.

Figure 30:
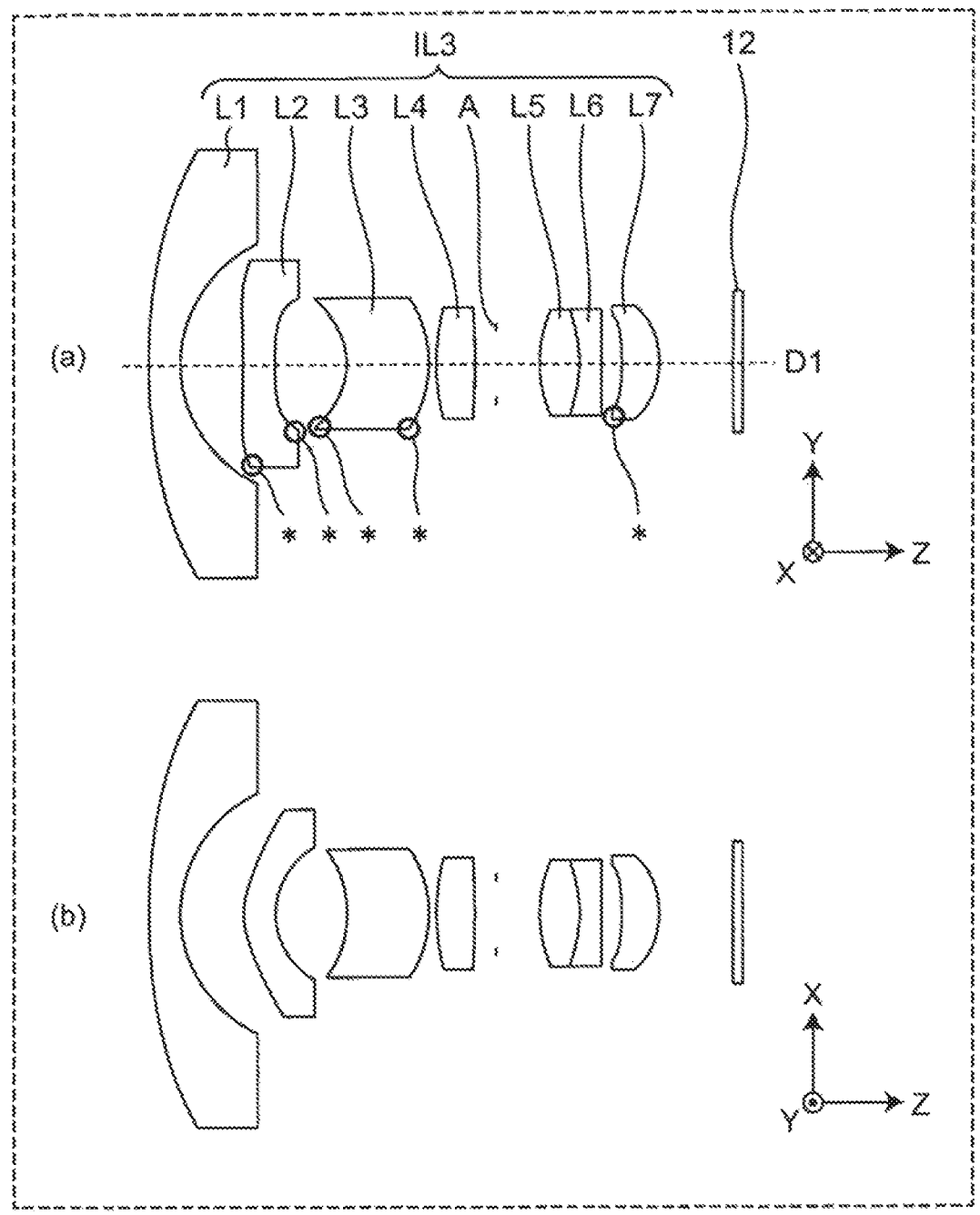
FIG. 30 is a lens layout diagram showing a configuration of a lens system according to a third example.

FIG. 30 shows a configuration of lens system IL3 according to the third example. Parts (a), (b) of FIG. 30 show lens layout diagrams of lens system IL3, similarly to the parts (a), (b) of FIG. 2, respectively.

Lens system IL3 of the third example has similar configuration to that of the first example, wherein the surface facing the image surface side in seventh lens element L7 is changed from a free-curved surface to an aspherical surface. In the present example, only one surface, facing the object side in seventh lens element L7, is a free-curved surface that is located closer to the image surface side than diaphragm A. A numerical value example corresponding to lens system IL3 of the third example is shown in FIGS. 31 to 42.

FIG. 31 shows surface data of lens system IL3 in a third numerical value example, similarly to FIG. 4 of the first numerical value example. FIG. 32 shows various data of lens system IL3 in the present example, similarly to FIG. 5.

FIGS. 33 to 36 respectively show free-curved surface data of second to sixth surfaces s2 to s6 in lens system IL3 of the third numerical value example, similarly to the first numerical value example. FIGS. 37, 38 respectively show aspherical surface data of seventh and eighth surfaces s7, s8 in lens system IL3 of the present example, similarly to FIGS. 10, 11.

FIG. 39 shows free-curved surface data of 13th surface s13 in lens system IL3 of the present example, similarly to FIG. 12. FIG. 40 shows aspherical surface data of 14th surface s14 in lens system IL3 of the present example. Aspherical surface data in FIG. 40 shows, for the surface facing the image surface side in seventh lens element L7, the coefficients of the mathematical expression (E2), similarly to the above-described aspherical surface data.

Figure 41:
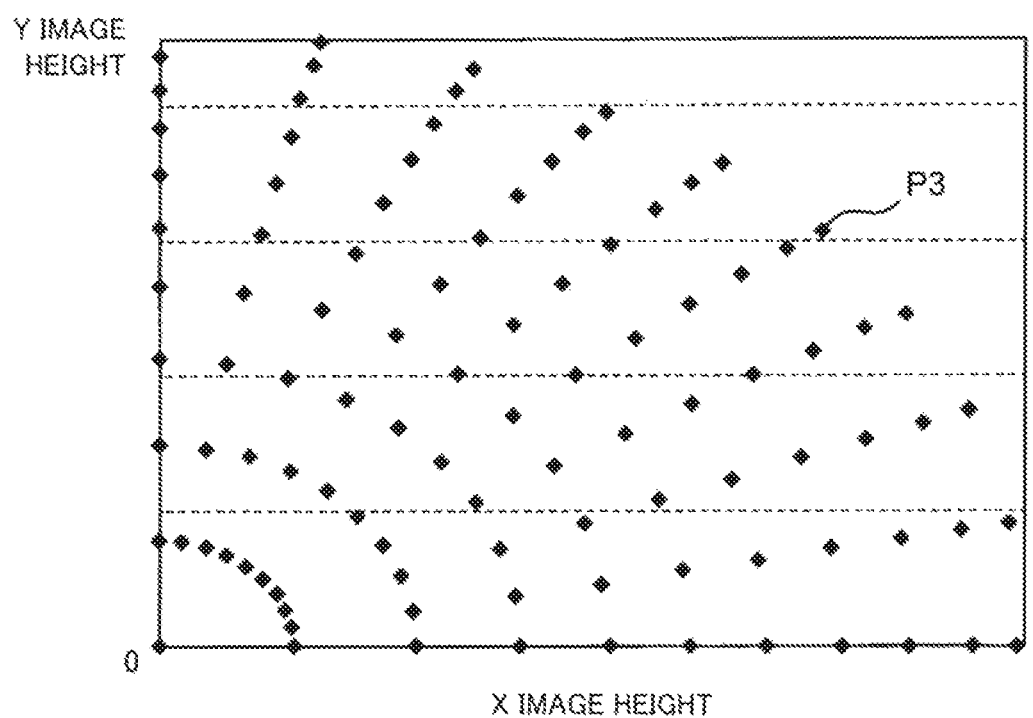
FIG. 41 is a scatter plot showing a relationship between an angle of view and an image point in the lens system of the third numerical value example.

Based on the third numerical value example described above, FIG. 41 shows a relationship between an angle of view and image point P3 in lens system IL3 of the present example. Also with lens system IL3 of the present example, image formation in which a vicinity of a center is enlarged with a wide angle of view being ensured can be achieved, as shown in FIG. 41.

Figure 42:
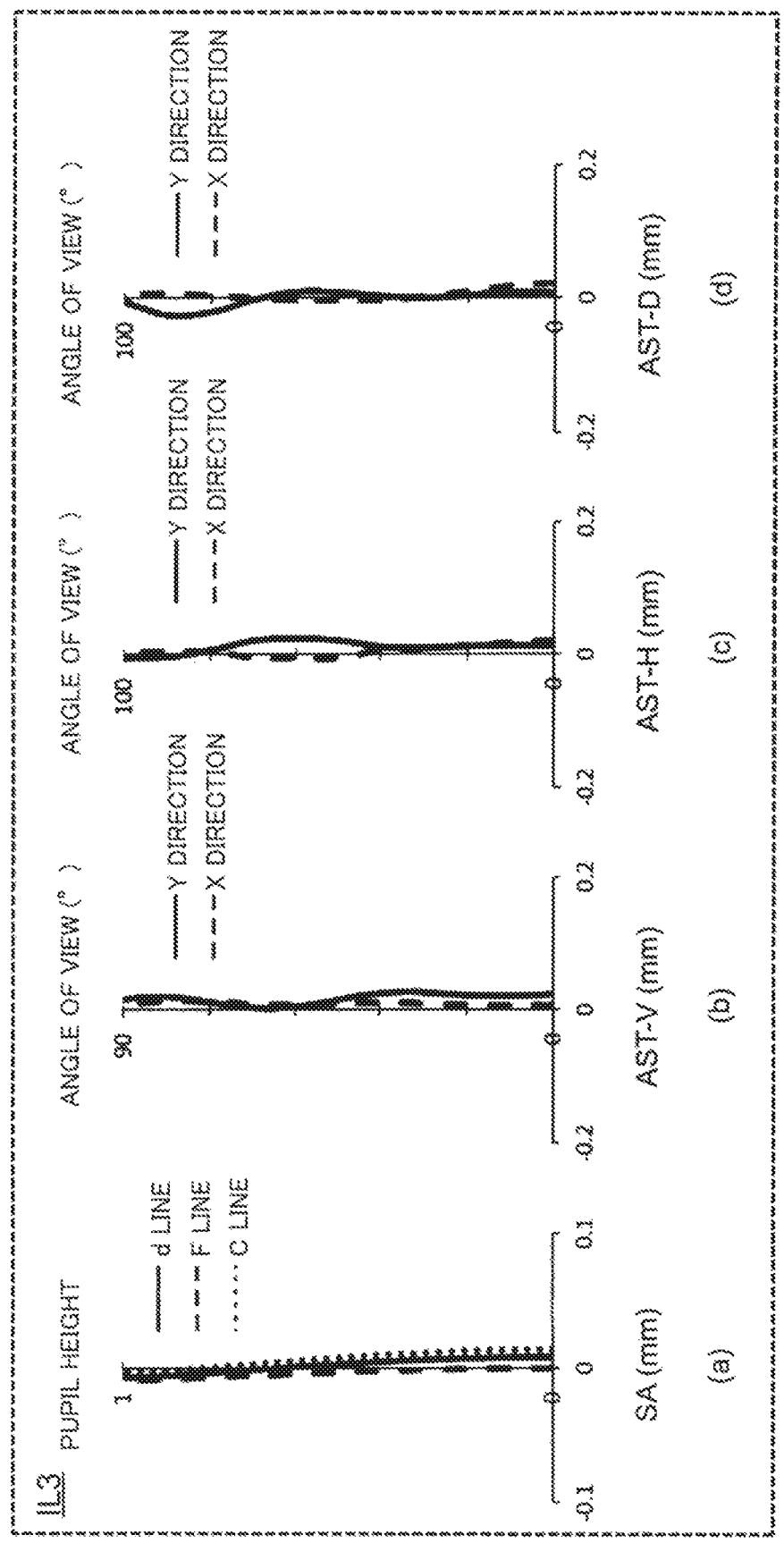
FIG. 42 is an aberration diagram showing various aberrations of the lens system of the third numerical value example.

FIG. 42 shows various aberrations of lens system IL3 in the present example. Parts of (a), (b), (c), (d) of FIG. 42 show each aberration diagrams of lens system IL3 in the present example, similarly to the parts (a) to (d) of FIG. 14, respectively. As shown in FIG. 15, lens system IL3 of the present example also satisfies the conditional expressions (1) to (7).

2-5. Fourth Example

In lens system IL of the present embodiment, at least one of first and second lens elements L1, L2 may have a free-curved surface. In a fourth example, an example of lens system IL4 will be described with reference to FIGS. 43 to 57 in which first lens element L1 has a free-curved surface, whereas second lens element L2 does not have a free-curved surface.

Figure 43:
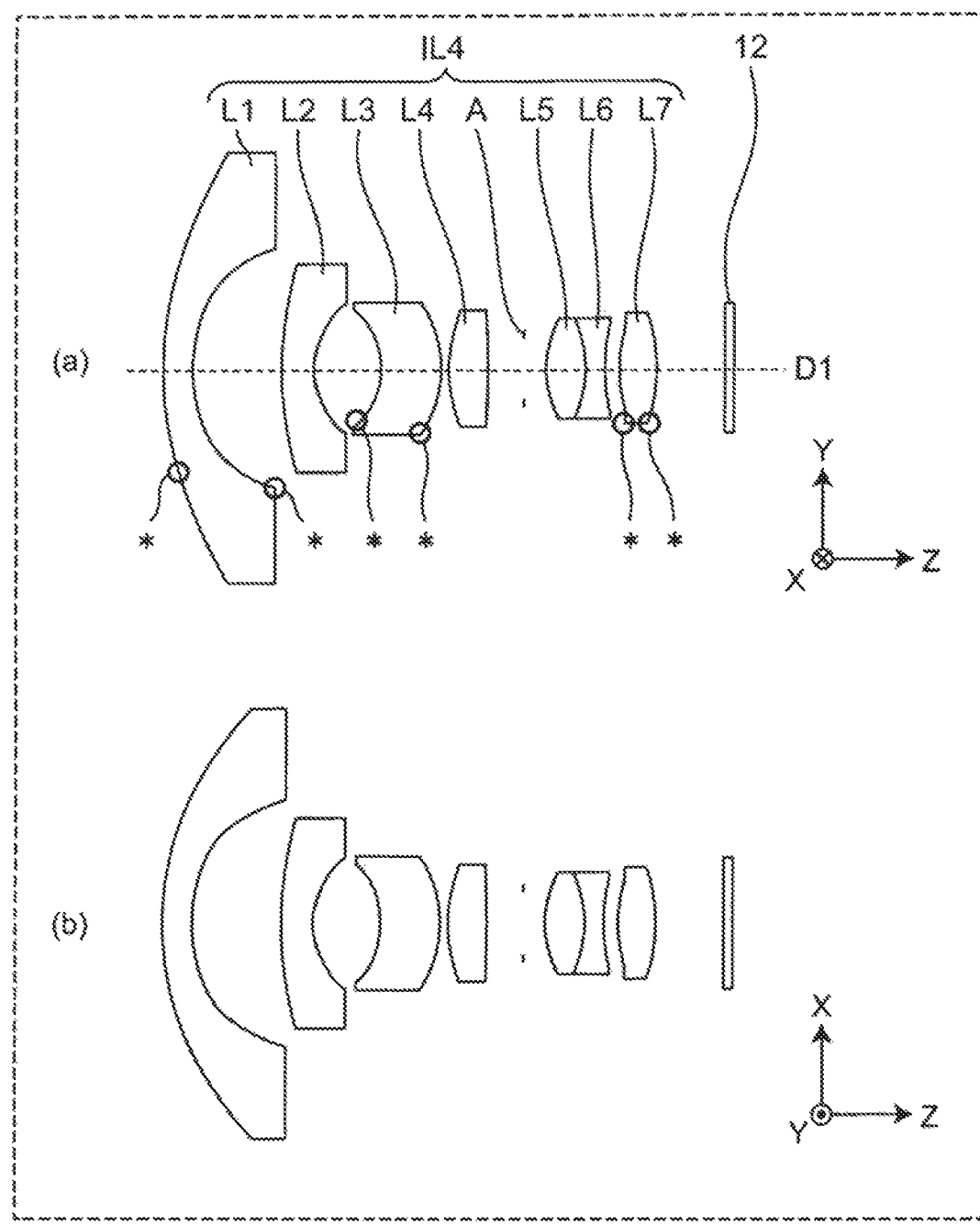
FIG. 43 is a lens layout diagram showing a configuration of a lens system according to a fourth example.

FIG. 43 shows a configuration of lens system IL4 according to the fourth example. Parts (a), (b) of FIG. 43 show lens layout diagrams of lens system IL4, similarly to the parts (a), (b) of FIG. 2, respectively.

Lens system IL4 of the fourth example has similar configuration to that of the first example, wherein both surfaces of first lens element L1 are changed to free-curved surfaces and both surfaces of second lens element L2 are changed to aspherical surfaces. A numerical value example corresponding to lens system IL4 of the fourth example is shown in FIGS. 44 to 57.

FIG. 44 shows surface data of lens system IL4 in a fourth numerical value example, similarly to FIG. 4 of the first numerical value example. FIG. 45 shows various data of lens system IL4 in the present example, similarly to FIG. 5.

FIGS. 46, 47 show free-curved surface data of first and second surfaces s1, s2 in lens system IL4 of the present example, respectively. Free-curved surface data in FIGS. 46, 47 show, for both surfaces each facing the object side and the image surface side in first lens element L1, the coefficients of the mathematical expression (E1), similarly to the first numerical value example.

FIGS. 48, 49 show aspherical surface data of third and fourth surfaces s3, s4 in lens system IL4 of the present example, respectively. The aspherical surface data in FIGS. 48, 49 show, for both surfaces of second lens element L2, the coefficients of the mathematical expression (E2), similarly to the first numerical value example.

FIGS. 50, 51 respectively show free-curved surface data of fifth and sixth surfaces s5, s6 in lens system IL4 of the present example, similarly to FIGS. 8, 9. FIGS. 52, 53 respectively show aspherical surface data of seventh and eighth surfaces s7, s8 in lens system IL4, similarly to FIGS. 10, 11. FIGS. 54, 55 respectively show free-curved surface data of 13th and 14th surfaces s13, s14 in lens system IL4, similarly to FIGS. 12, 13.

Figure 56:
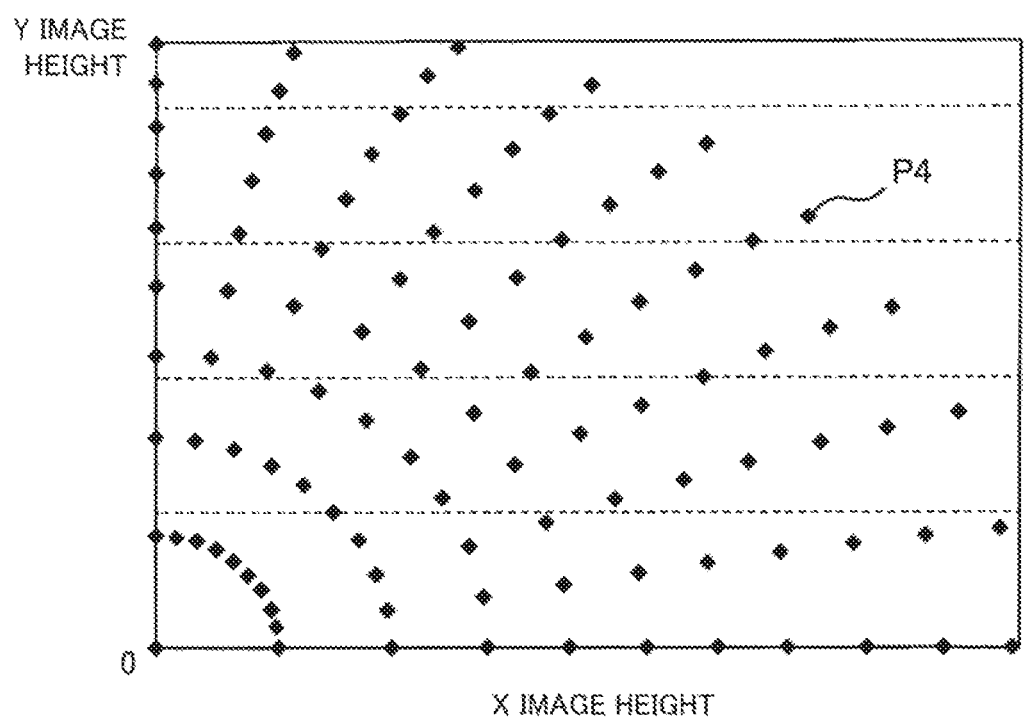
FIG. 56 is a scatter plot showing a relationship between an angle of view and an image point in the lens system of the fourth numerical value example.

Based on the fourth numerical value example described above, FIG. 56 shows a relationship between an angle of view and image point P4 in lens system IL4 of the present example. Also with lens system IL4 of the present example, image formation in which a vicinity of a center is enlarged with a wide angle of view being ensured can be achieved, as shown in FIG. 56.

Figure 57:
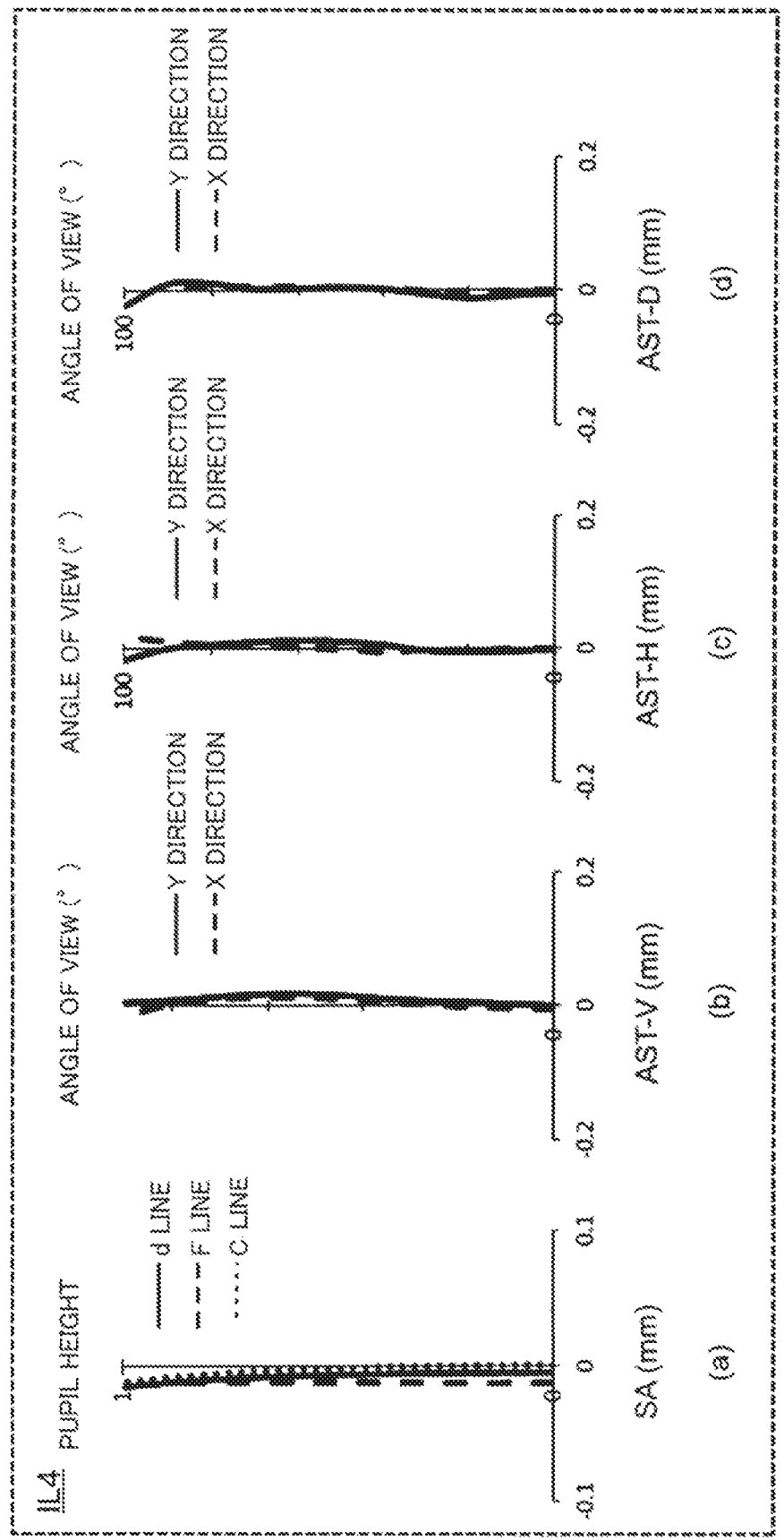
FIG. 57 is an aberration diagram showing various aberrations of the lens system of the fourth numerical value example.

FIG. 57 shows various aberrations of lens system IL4 in the present example. Parts (a), (b), (c), (d) of FIG. 57 show aberration diagrams of lens system IL4 in the present example, similarly to the parts (a) to (d) of FIG. 14, respectively. As shown in FIG. 15, lens system IL4 of the present example also satisfies the conditional expressions (1) to (7).

Second Embodiment

Hereinafter, a second embodiment will be described with reference to the drawings. In the second embodiment, an example will be described in which imaging device 10 including lens system IL described above is applied to an in-vehicle application.

Hereinafter, description of the same configurations and operations as those in the first embodiment will be omitted as appropriate, and an imaging system according to the present embodiment will be described.

1. Configuration

Figure 58:
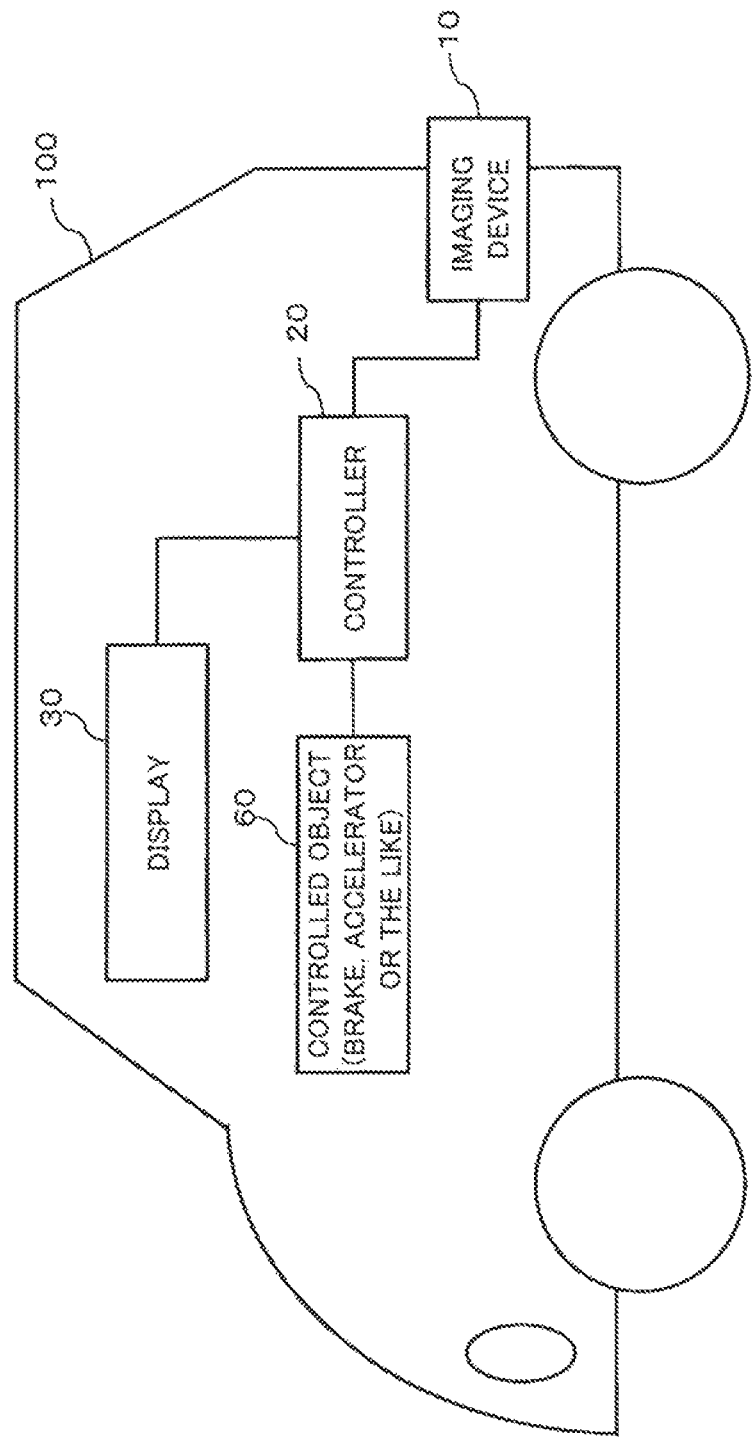
FIG. 58 is a diagram showing a configuration of an imaging system according to a second embodiment.

FIG. 58 is a diagram showing a configuration of an imaging system according to the second embodiment. In an example of FIG. 58, imaging device 10 is applied to a rear camera of vehicle 100 such as an automobile. Imaging device 10 captures an image of a subject behind vehicle 100, to generate image data. Imaging device 10 is attached to vehicle 100 so as to face backward in order to capture an image of a scene behind vehicle 100.

Vehicle 100 includes: controller 20 that processes the image data from imaging device 10; display 30 that displays an image based on the image data processed by controller 20; and controlled object 60 that is controlled by controller 20. Imaging device 10 and controller 20 form the imaging system. The imaging system may include display 30 in addition to or instead of controller 20.

Controller 20 is an example of an image processor that acquires image data from imaging device 10. For example, controller 20 recognizes various objects, such as a person, a bicycle, and a car obstacle behind vehicle 100, by image analysis, and controls controlled object 60 as necessary. For example, controlled object 60 is a brake, an accelerator, a warning device or the like. Controller 20 also performs predetermined image processing on the image data from imaging device 10, and generates image data to be displayed on display 30.

Controller 20 includes a CPU, an MPU, or the like that realizes various functions by executing a program stored in an internal memory such as, for example, a flash memory. Controller 20 may include a dedicated hardware circuit designed to implement a desired function. That is, controller 20 may include a CPU, an MPU, a DSP, an FPGA, an ASIC and the like.

Display 30 is an electronic room mirror, an in-vehicle display, or the like. Display 30 includes a display device such as a liquid crystal display panel or an organic EL display, and a drive circuit that drives the display device. Display 30 displays an image of a scene behind vehicle 100 captured by imaging device 10, for example, when vehicle 100 moves backward. A driver can grasp a situation behind vehicle 100 by checking the image when vehicle 100 moves backward, so that vehicle 100 can be safely moved backward.

Figure 59:
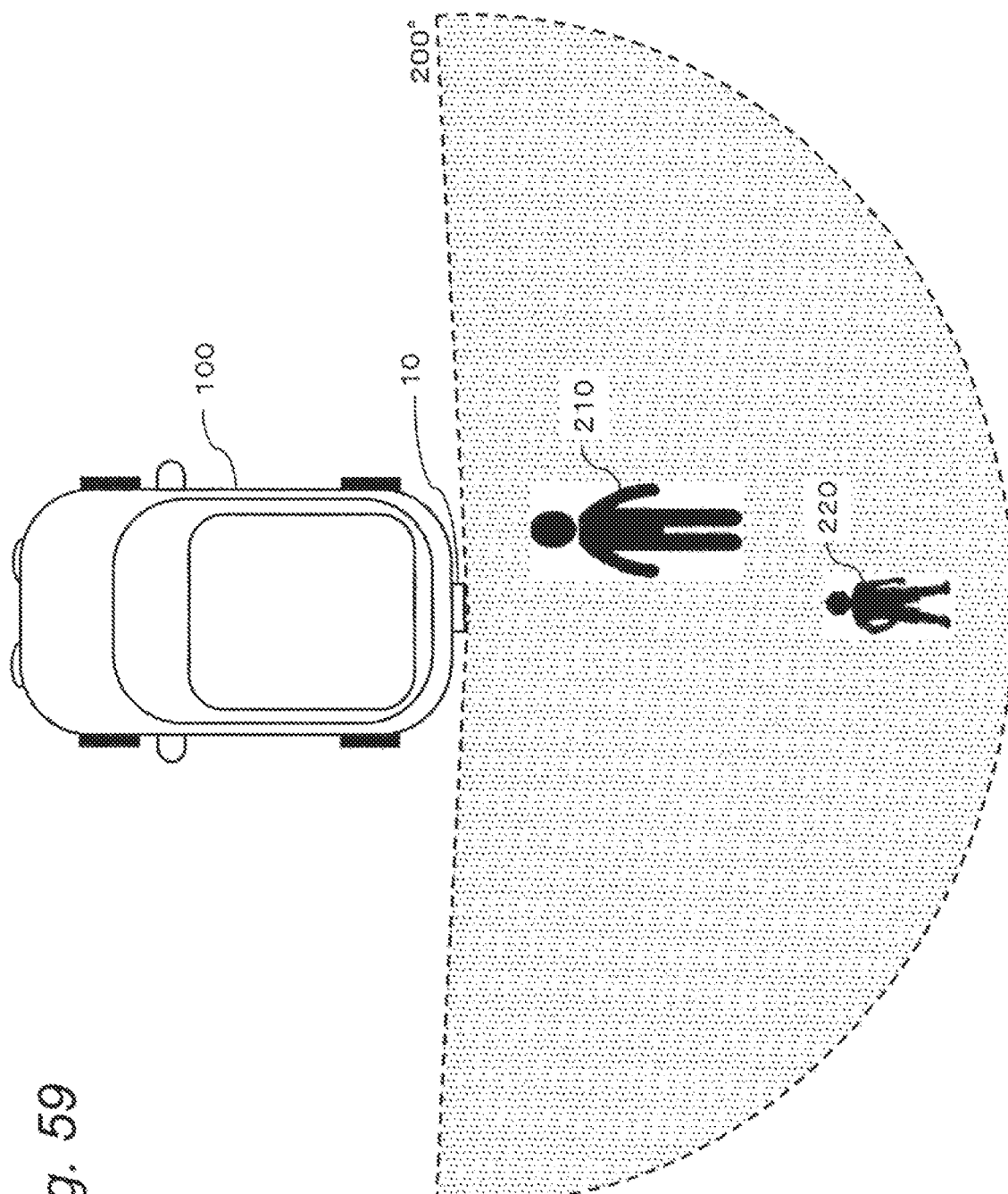
FIG. 59 is a view for explaining a horizontal angle of view of an imaging device according to the second embodiment.
Figure 60:
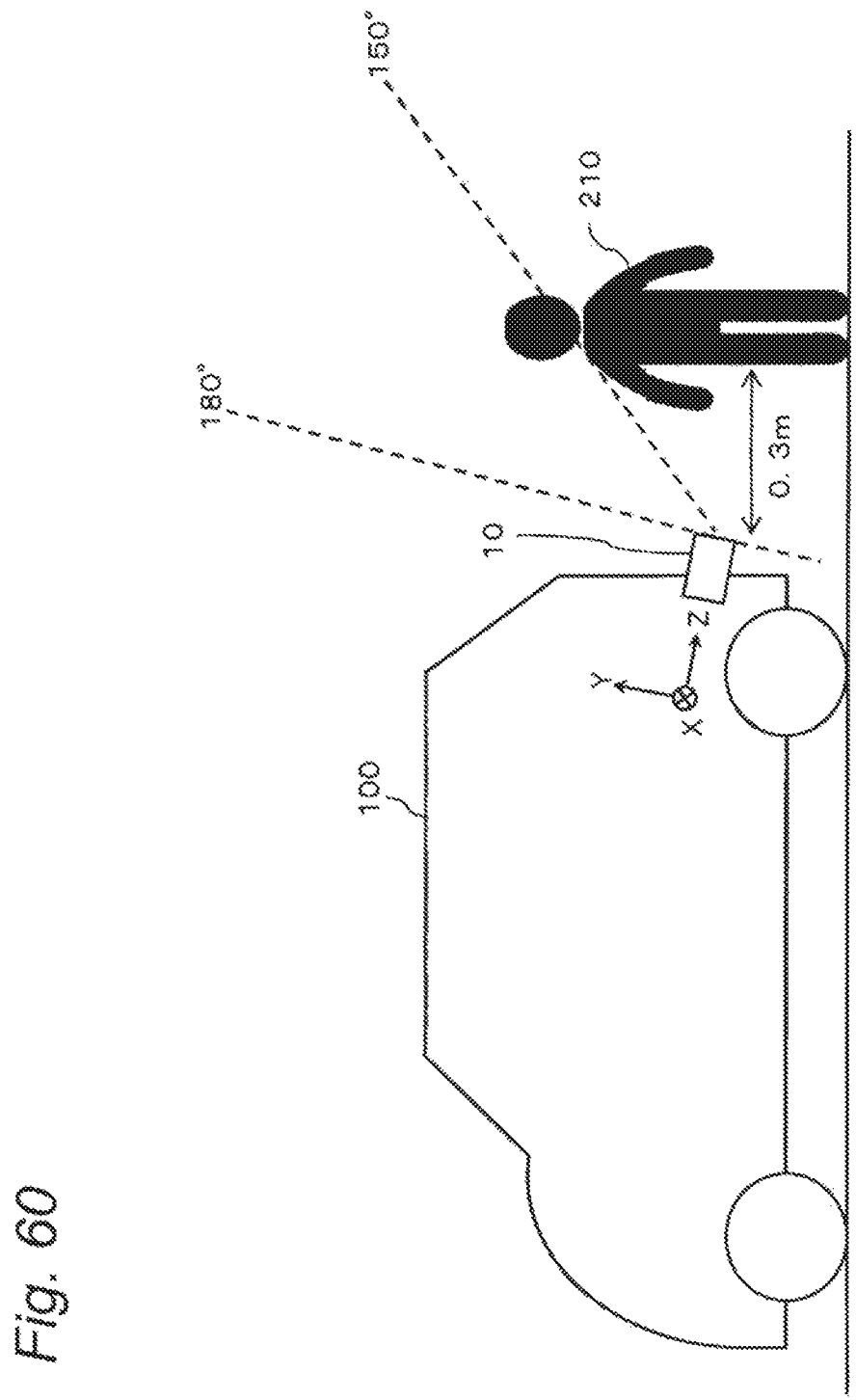
FIG. 60 is a view for explaining a vertical angle of view of the imaging device according to the second embodiment.

In the imaging system of the present embodiment, a range in which imaging device 10 can capture an image is illustrated in FIGS. 59, 60. FIG. 59 is a view illustrating a horizontal angle of view of imaging device 10. FIG. 60 is a view illustrating a vertical angle of view of imaging device 10.

For example, imaging device 10 can capture the image within a range of an angle of view of 200° in the horizontal direction, as shown in FIG. 59. Also, as illustrated in FIG. 60, imaging device 10 can capture the image within a range of 180° in the vertical direction. As described above, imaging device 10 according to the present embodiment can capture an image with a wide angle of view. In the example of FIG. 60, imaging device 10 is attached to a rear bumper or the like in vehicle 100 with a predetermined depression angle.

2. Operations

Operations of the imaging system configured as described above will be described below.

Figure 61:
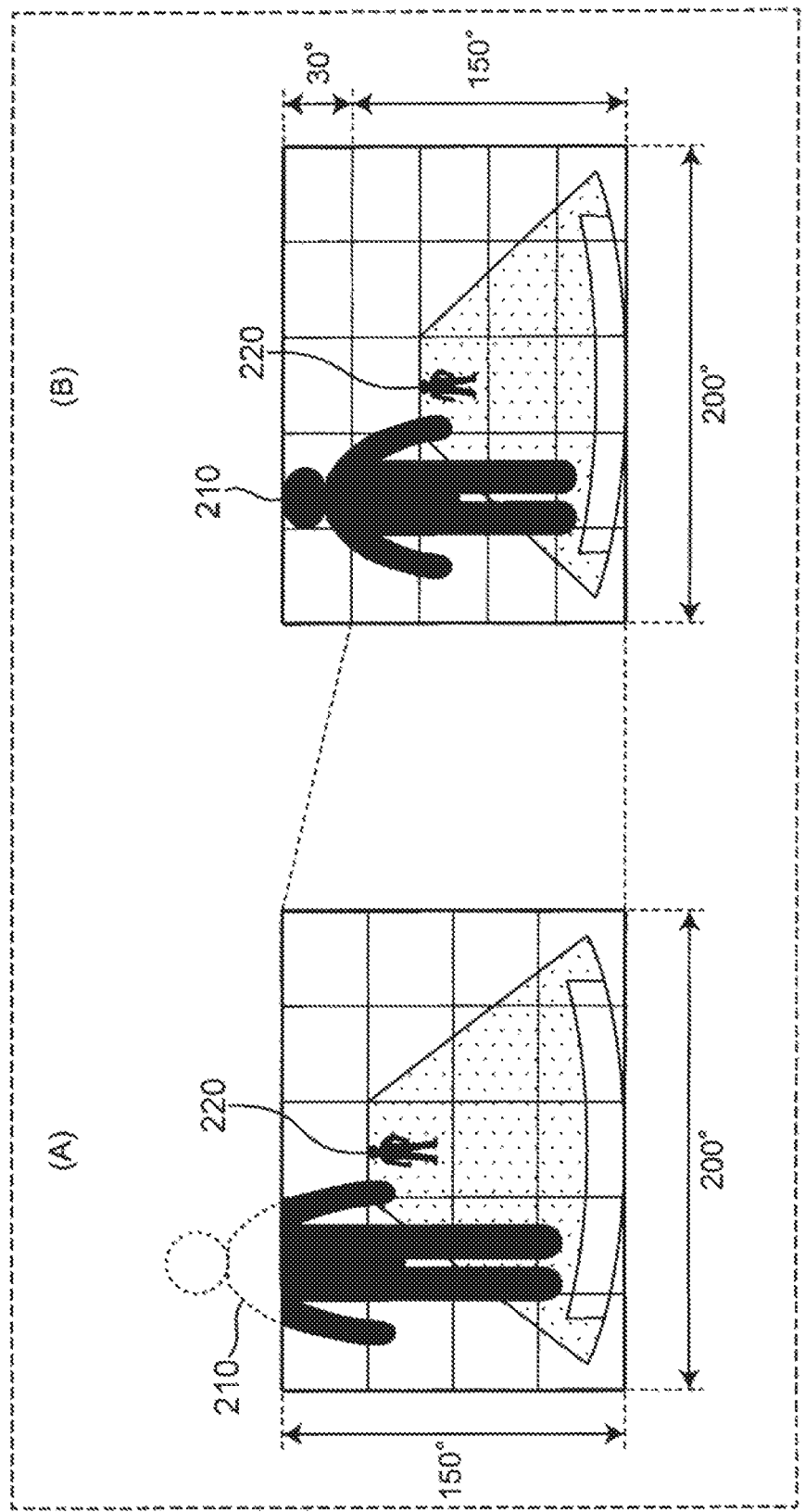
FIG. 61 is a view for explaining possible problems in an in-vehicle imaging system.

In the imaging system of the present embodiment, imaging device 10 including lens system IL described above can solve problems, possibly occurring when an image is to be captured with a wide angle of view in the vertical direction in a situation shown in FIGS. 59, 60, for example. The problems possibly occurring in the in-vehicle imaging system will be described with reference to FIGS. 60, 61. A part (A) of FIG. 61 illustrates an image captured by a conventional rear camera. A part (B) of FIG. 61 shows an example of a captured image when an angle of view is widened from the part (A) of FIG. 61.

As shown in FIG. 60, in a the case that person 210 is located behind vehicle 100 at a short distance from vehicle 100 (e.g., 0.3*m*), a portion of person 210, including a face, is out of an angle of view range, if the angle of view range in the vertical direction for capturing an image is narrow. Therefore, the captured image does not contain the face of person 210, so that there is a possibility that the person is not detected during image analysis based on the captured image. In particular, imaging device 10 is attached to vehicle 100 with a depression angle, and hence when a person is located near vehicle 100, it is more difficult to capture an image of the face. Then, in order to more reliably contain a portion including the face of a person within an angle of view range, it could be considered to widen the vertical angle of view of imaging device 10. However, if the vertical angle of view is simply widened, following problems can be further considered.

For example, when an upper portion of person 210 is out of the angle of view range with the vertical angle of view of 150° as shown in the part (A) of FIG. 61, it could be considered that the vertical angle of view is set to 180° by widening by just 30° as shown in the part (B) of FIG. 61. Thereby, the portion above shoulders of person 210 also falls within the angle of view range, allowing the face of person 210 to be contained in the captured image. In this case, the captured image shown in the part (B) of FIG. 61 contains a wider subject range while having the same image size as the captured image shown in the part (A) of FIG. 61. Therefore, a size of each object contained in the captured image shown in the part (B) of FIG. 61 is smaller than that contained in the captured image shown in the part (A) of FIG. 61.

For example, a size of person 220 located away from vehicle 100 in the captured image of the part (B) of FIG. 61 is smaller than that in the part (A) of FIG. 61. Therefore, resolution of an image of a face portion of person 220 is insufficient, so that there occurs a problem that a face cannot be detected during image analysis on person 220. This problem becomes more remarkable, especially when person 220 is a small child, due to a small face size.

Figure 62:
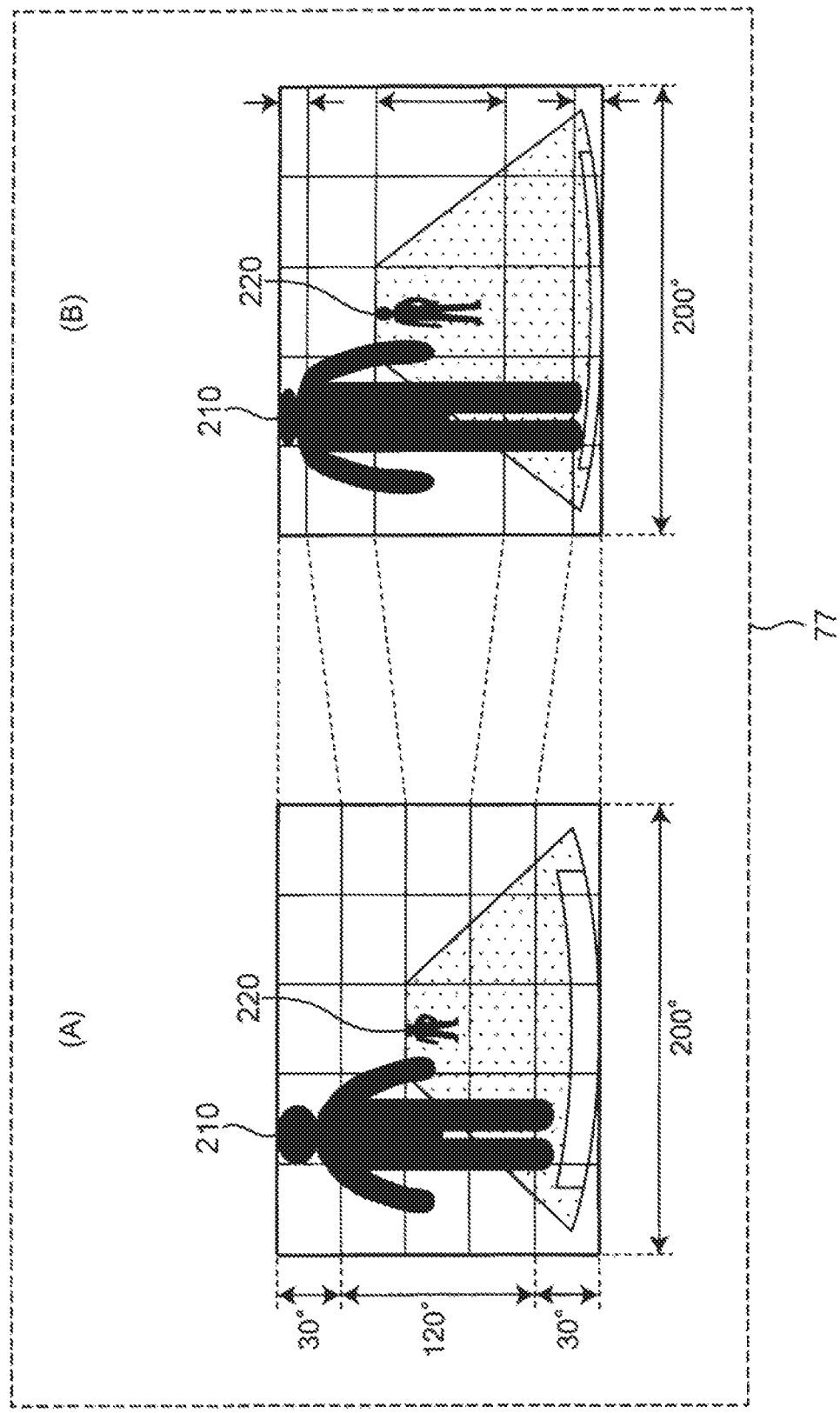
FIG. 62 is a view for explaining a way of solving the problems of FIG. 61.

A way of solving the above problems by imaging device 10 of the present embodiment will be described with reference to FIG. 62. A part (A) of FIG. 62 illustrates a captured image similar to the part (B) of FIG. 61. A part (B) of FIG. 62 illustrates an image captured by imaging device 10 of the present embodiment in the same situation as in the part (A) of FIG. 62.

The image shown in the part (A) of FIG. 62 is obtained by forming an image at a uniform enlargement factor, similarly to the parts (A), (B) of FIG. 61. In contrast to this, imaging device 10 of the present embodiment forms an image of a subject on imaging element 12 by using lens system IL described above such that sufficient resolution is obtained for an image area such as a central portion that desired to be watched carefully with an angle of view being enlarged as a whole in the vertical direction. Thereby, in imaging device 10 of the present embodiment, an image as shown in the part (B) of FIG. 62 is formed on imaging element 12.

In the image shown in the part (B) of FIG. 62, an image of the central portion of the image is more enlarged and images of upper and lower ends (i.e., angle of view ranges of 30°) are compressed, as compared with the image shown in the part (A) of FIG. 62, while the vertical angle of view is ensured at 180° similarly to the image shown in the part (A) of FIG. 62. Thereby, an image can be obtained with an area of the central portion desired to be watched carefully having high resolution and a wide angle of view being achieved in the vertical direction. Hence, the above-described problems can be solved.

That is, imaging device 10 of the present embodiment has a wide angle of view in the vertical direction, and thus even when there is a person near the rear of vehicle 100 as shown in FIG. 60, an image containing an upper portion of the person (i.e., a portion containing the face) can be captured, as shown in the part (B) of FIG. 62. Therefore, the person can be detected more reliably by face detection by image analysis. Further, according to imaging device 10 of the present embodiment, an image can be generated so as to have high resolution in the central portion of an imaging range that is an important area for sensing. Therefore, even when there is a small child in the central area of the imaging range behind vehicle 100 for example, an image is captured such that the central area is enlarged, so that image data of a sufficient size for image analysis can be obtained. Therefore, even a child with a small body size can be recognized more reliably.

According to imaging device 10 of the present embodiment, an image can be captured with a wide angle of view range and an image of a subject in the central portion of the imaging range can be captured with high resolution, as described above. Therefore, an accuracy of image analysis using the captured image can be improved.

3. Summary

As described above, the imaging system according to the present embodiment includes imaging device 10 and controller 20 that is an example of an image processor. The controller 20 performs image processing on the image captured by imaging device 10.

According to the above-described imaging system, image capturing can be realized by lens system IL of imaging device 10 so that resolution of the central portion in the image is increased as necessary for sensing with a wide angle of view being ensured as a whole. Therefore, an accuracy of analyzing the captured image can be improved. Further, by purposely changing vertical resolution and horizontal resolution of an image formed on the imaging surface, a horizontal angle of view and a vertical angle of view of the optical system can be set arbitrarily, irrespective of an aspect ratio of imaging sensor 12.

Other Embodiments

As described above, the first and second embodiments have been described as examples of the technology disclosed in the present application. However, the technology in the present disclosure is not limited thereto, and can also be applied to embodiments in which modifications, replacements, additions, omissions or the like are appropriately made. Also, a new embodiment can be made by combining each constituent elements described in each of the above-described embodiments. Other embodiments will be therefore described as examples below.

In the first embodiment, an example has been described in which lens system IL includes seven lens elements L1 to L7. A number of lens elements in lens system IL of the present embodiment is not limited to seven, and may be eight or more, or may be six or less.

In the above-described second embodiment, imaging device 10 is arranged to capture the image of the scene behind the vehicle. However, imaging device 10 may be arranged to capture an image of a scene in front of or on the side of a vehicle.

In each of the above-described embodiments, vehicle 100, such as an automobile, has been described as an example of a moving body to which imaging device 10 is to be applied. However, the moving body is not limited to an automobile. The imaging device according to the above-described embodiments may be applied to another moving body such as a railroad, a ship, an aircraft, a robot, a robot arm, a drone, an agricultural machine e.g. a combine harvester, or a construction machine e.g. a crane. Alternatively, imaging device 10 may be applied to a surveillance camera.

In each of the above-described embodiments, imaging device 10 performs gamma correction, distortion correction or the like, on an image. However, controller 20 may perform such image processing. Alternatively, imaging device 10 may perform gamma correction and controller 20 may perform distortion correction.

The angle of view, the resolution and the like shown in each of the above-described embodiments are examples, and they can be appropriately set according to an object, an event and the like, to be subjected to the image analysis.

As described above, embodiments have been described as examples of the technology in the present disclosure. For this purpose, the accompanying drawings and detailed description have been provided.

Therefore, the constituent elements described in the accompanying drawings and detailed description can include: not only constituent elements essential for solving the problems; but also those not essential for solving the problems, in order to describe the technology as examples. Therefore, those non-essential constituent elements should not be immediately recognized as being essential as they are described in the accompanying drawings and detailed description.

Additionally, the above-described embodiments are to describe the technology in the present disclosure as examples, and hence various modifications, replacements, additions, omissions or the like can be made within the scopes of the claims or their equivalents.

Summary of Aspects

Hereinafter, various aspects according to the present disclosure will be described as examples.

A first aspect according to the present disclosure is a lens system that forms an image on an imaging element. The lens system includes: a first lens element, a second lens element, and a third lens element, which are arranged in order from an object side to an image surface side along an optical axis; and a diaphragm. In the lens system, at least one of the first lens element and the second lens element has a free-curved surface that is asymmetric with respect to the optical axis. The first lens element has a shape of a surface facing the object side, the shape being convex toward the object side. The second lens element has a shape of a surface facing the image surface side, the shape being convex toward the object side. The third lens element has a shape of a surface facing the object side, the shape being convex toward the image surface side. The lens system has one or more free-curved surfaces closer to the image surface side than the diaphragm.

According to the above lens system, a vicinity of a center of an image formed on the imaging element can be enlarged with a wide angle of view being ensured, by using the free-curved surface in at least one of the first and second lens elements and the free-curved surface closer to the image surface side than the diaphragm.

In a second aspect, the lens system of the first aspect has a free-curved surface that satisfies a following conditional expression (1):

$$0.01 < |Smax - Smin|/IH < 0.65 \tag{1}$$

where,

Smax is a maximum sag amount of the free-curved surface at 60% of the longest image height, Smin is a minimum sag amount of the free-curved surface at 60% of the longest image height, and IH is a length of 60% of the longest image height. With this, formation of an image in which the vicinity of the center is enlarged with a wide angle of view being ensured can be facilitated by change of the sag amounts of the free-curved surface within a proper range.

In a third aspect, in the lens system according to the first or second aspect, the first lens element satisfies a following conditional expression (2):

$$Nd1 > 1.7 \tag{2}$$

where,

Nd1 is a refractive index of the first lens element with respect to d-line. With this, ensuring an angle of view and so on can be facilitated by setting the refractive index of the first lens element such that a ray of light from the outside is greatly bent.

In a fourth aspect, in the lens system according to any one of the first to third aspects, the lens element having the free-curved surface satisfies a following conditional expression (3):

$$40 < Vd < 60 \tag{3}$$

where,

Vd is an Abbe's number of the lens element having the free-curved surface. With this, in the lens element having the free-curved surface, ensuring an image forming performance of the lens system against a temperature change can be facilitated by properly setting the Abbe's number.

In a fifth aspect, in the lens system according to any one of the first to fourth aspects, the lens element having the free-curved surface satisfies a following conditional expression (4):

$$Nd > 1.5 \quad (4)$$

where,

Nd is a refractive index of the lens element having the free-curved surface with respect to d-line. With this, controlling a ray of light freely can be facilitated by using the free-curved surface lens having a higher refractive index in the lens system.

In a sixth aspect, the lens system according to any one of the first to fifth aspects satisfies a following conditional expression (5):

$$H\omega - V\omega < 20 \quad (5)$$

where,

Hω is a half angle of view in the horizontal direction, and

Vω is a half angle of view in the vertical direction. With this, an effect of widening the angle can be obtained in the horizontal direction and the vertical direction.

In a seventh aspect, the lens system according to any one of the first to sixth aspects satisfies a following conditional expression (6):

$$0 \le |NN - NP| \le 2 \quad (6)$$

where,

NN is a number of lens elements having the free-curved surface and having negative power, and NP is a number of lens elements having the free-curved surface and having positive power. With this, an image forming performance of the lens system against a temperature change or the like can be improved.

In an eighth aspect, the lens system according to any one of the first to seventh aspects satisfies a following conditional expression (7).

$$|\Delta NdF / \Delta Nd1| > 10 \quad (7)$$

where,

ΔNd1 is a refractive index change rate of the first lens element with respect to d-line in response to a temperature change at 25° C., and ΔNdF is a refractive index change rate of a lens element having the free-curved surface with respect to d-line in response to a temperature change at 25° C. With this, an image forming performance of the lens system against a temperature change can be improved.

A ninth aspect is an imaging device including the lens system according to any one of the first to eighth aspects and an imaging element. The imaging element captures an image formed via the lens system. In the imaging device, a vicinity of a center of the image formed on the imaging element can be enlarged with a wide angle of view being ensured, by the lens system.

A tenth aspect is an imaging system including the imaging device according to the ninth aspect and an image processor. The image processor performs image processing on an image captured by the imaging device. In the imaging system, a vicinity of a center of the image formed on the imaging element can be enlarged with a wide angle of view being ensured, by the lens system of the imaging device.

INDUSTRIAL APPLICABILITY

The lens system according to the present disclosure can be applied to imaging devices for various purposes, and can be applied to, e.g., in-vehicle cameras, surveillance cameras, web cameras, digital cameras, or the like. Further, the lens system according to the present disclosure may be provided to interchangeable lens devices.

The invention claimed is:

1. A lens system that forms an image on an imaging element, comprising:

a first lens element, a second lens element, and a third lens element, which are arranged in order from an object side to an image surface side along an optical axis; a diaphragm arranged closer to the image surface side than the third lens element; and a lens element on the image surface side, which is arranged closer to the image surface side than the diaphragm, wherein at least one of the first lens element and the second lens element has a free-curved surface that is rotational asymmetric with respect to the optical axis, and one of the first lens element and the second lens element has free-curved surfaces on both sides of the object side and the image surface side, the third lens element has free-curved surfaces that are rotational asymmetric with respect to the optical axis, on both sides of the object side and the image surface side, the first lens element has a shape of a surface facing the object side, the shape being convex toward the object side, the second lens element has a shape of a surface facing the image surface side, the shape being convex toward the object side, the third lens element has a shape of a surface facing the object side, the shape being convex toward the image surface side, the lens element on the image surface side has, at least on the object side, a free-curved surface that is rotational asymmetric with respect to the optical axis, and the free-curved surface of at least one of the first lens element and the second lens element satisfies a following conditional expression (1):

$$0.01 < |Smax - Smin| / IH < 0.65 \quad (1)$$

where,

Smax is a maximum sag amount of the free-curved surface at 60% of a longest image height, Smin is a minimum sag amount of the free-curved surface at 60% of the longest image height, and IH is a length of 60% of the longest image height.

2. The lens system according to claim 1, wherein the first lens element satisfies a following conditional expression (2):

$$Nd1 > 1.7 \quad (2)$$

where,

Nd1 is a refractive index of the first lens element with respect to d-line.

3. The lens system according to claim 1, wherein a lens element having the free-curved surface satisfies a following conditional expression (3):

$$40 < Vd < 60 \quad (3)$$

where,
Vd is an Abbe's number of the lens element having the free-curved surface.

4. The lens system according to claim 1, wherein a lens element having the free-curved surface satisfies a following conditional expression (4):

$$Nd>1.5 \qquad (4)$$

where,
Nd is a refractive index of the lens element having the free-curved surface with respect to d-line.

5. The lens system according to claim 1, wherein the lens system satisfies a following conditional expression (5):

$$H\omega - V\omega < 20 \qquad (5)$$

where,
Hω) is a half angle of view in a horizontal direction, and
Vω) is a half angle of view in a vertical direction.

6. The lens system according to claim 1, wherein the lens system satisfies a following conditional expression (6):

$$|\Delta NdF/\Delta Nd1| \qquad (7)$$

where,
NN is a number of lens elements having the free-curved surface and having negative power, and
NP is a number of lens elements having the free-curved surface and having positive power.

7. An imaging device comprising:
the lens system according to claim 1; and
an imaging element to capture an image formed via the lens system.

8. An imaging system comprising:
the imaging device according to claim 7; and
an image processor to perform image processing on an image captured by the imaging device.

9. The lens system according to claim 1, wherein
the third lens element has negative power, and
the lens element on the image surface side has positive power.

10. The lens system according to claim 9, wherein the lens element on the image surface side has a shape of surface facing the image surface side, the shape being convex toward the object side in a first cross-section including the optical axis and convex toward the image surface side in a second cross-section orthogonal to the first cross-section.

11. The lens system according to claim 1, wherein every free-curved surface in the first lens element, the second lens element, the third lens element and the lens element on the image surface side has line symmetry with respect to a first axis and a second axis, the first axis being orthogonal to the optical axis and the second axis being orthogonal to the first axis and the optical axis.

12. A lens system that forms an image on an imaging element, comprising:
a first lens element, a second lens element, and a third lens element, which are arranged in order from an object side to an image surface side along an optical axis; a diaphragm arranged closer to the image surface side than the third lens element and a lens element on the image surface side, which is arranged closer to the image surface side than the diaphragm,
wherein
at least one of the first lens element and the second lens element has a free-curved surface that is rotational asymmetric with respect to the optical axis, and one of the first lens element and the second lens element has free-curved surfaces on both sides of the object side and the image surface side,
the third lens element has free-curved surfaces that are rotational asymmetric with respect to the optical axis, on both sides of the object side and the image surface side,
the first lens element has a shape of a surface facing the object side, the shape being convex toward the object side,
the second lens element has a shape of a surface facing the image surface side, the shape being convex toward the object side,
the third lens element has a shape of a surface facing the object side, the shape being convex toward the image surface side,
the lens element on the image surface side has, at least on the object side, a free-curved surface that is rotational asymmetric with respect to the optical axis, and
the lens system satisfies a following conditional expression (7):

$$|\Delta NdF/\Delta Nd1| \qquad (7)$$

where,
ΔNd1 is a refractive index change rate of the first lens element with respect to d-line in response to a temperature change at 25° C., and
ΔNdF is a refractive index change rate of a lens element having the free-curved surface with respect to d-line in response to a temperature change at 25° C.

13. A lens system that forms an image on an imaging element, comprising:
a first lens element, a second lens element, and a third lens element, which are arranged in order from an object side to an image surface side along an optical axis; a diaphragm arranged closer to the image surface side than the third lens element and a lens element on the image surface side, which is arranged closer to the image surface side than the diaphragm,
wherein
at least one of the first lens element and the second lens element has a free-curved surface that is rotational asymmetric with respect to the optical axis, and one of the first lens element and the second lens element has free-curved surfaces on both sides of the object side and the image surface side,
the third lens element has free-curved surfaces that are rotational asymmetric with respect to the optical axis, on both sides of the object side and the image surface side,
the first lens element has a shape of a surface facing the object side, the shape being convex toward the object side,
the second lens element has a shape of a surface facing the image surface side, the shape being convex toward the object side,
the third lens element has a shape of a surface facing the object side, the shape being convex toward the image surface side,
the lens element on the image surface side has, at least on the object side, a free-curved surface that is rotational asymmetric with respect to the optical axis, and
every free-curved surface in the first lens element, the second lens element, the third lens element and the lens element on the image surface side satisfies a following conditional expression (1):

$$0.01<|Smax-Smin|/IH<0.65 \qquad (1)$$

where,
Smax is a maximum sag amount of the free-curved surface at 60% of a longest image height,
Smin is a minimum sag amount of the free-curved surface at 60% of the longest image height, and
IH is a length of 60% of the longest image height.

\* \* \* \* \*